(12) United States Patent
Hayakawa et al.

(10) Patent No.: US 6,172,732 B1
(45) Date of Patent: Jan. 9, 2001

(54) LIQUID CRYSTAL DISPLAY DEVICE SUITED TO NARROW FRAME

(75) Inventors: Kouji Hayakawa, Mobara; Masayoshi Fujieda, Ohhara-machi; Noboru Hoshino; Yoshiyuki Imasaka, both of Mobara, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 08/973,208

(22) PCT Filed: Jun. 16, 1995

(86) PCT No.: PCT/JP95/01201

§ 371 Date: Dec. 4, 1997

§ 102(e) Date: Dec. 4, 1997

(87) PCT Pub. No.: WO97/00462

PCT Pub. Date: Jan. 3, 1997

(51) Int. Cl.[7] .................. G02F 1/1345; G02F 1/1343
(52) U.S. Cl. .................... 349/152; 349/139; 349/151
(58) Field of Search .................................. 349/139, 106, 349/152, 155, 151

(56) References Cited

U.S. PATENT DOCUMENTS

| | | | |
|---|---|---|---|
| 5,671,030 | * 9/1997 | Ohnuma et al. | 349/106 |
| 5,757,450 | * 5/1998 | Fujii et al. | 349/106 |
| 5,818,563 | * 10/1998 | Colgan et al. | 349/158 |
| 5,893,624 | * 4/1999 | Matsushira et al. | 349/152 |
| 5,982,470 | * 9/1999 | Nakahara et al. | 349/153 |

* cited by examiner

Primary Examiner—William L. Sikes
Assistant Examiner—Dung Nguyen
(74) Attorney, Agent, or Firm—Antonelli, Terry, Stout & Kraus, LLP

(57) ABSTRACT

In order to provide a liquid crystal display device of high display quality by improving the evenness of a liquid crystal cell gap in a marginal frame portion of a liquid crystal element suited to a narrow frame, the liquid crystal display device is provided with a pair of liquid crystal display element substrates having a liquid crystal sandwiched therebetween, and a plurality of liquid crystal driving elements connected to conductors formed on each of the liquid crystal display element substrates, for driving the liquid crystal. Each of the liquid crystal display element substrates includes a plurality of display electrodes wired in parallel, a plurality of parallel terminal electrodes, mutually parallel oblique straight wiring electrodes, and a plurality of dummy electrodes generally parallel to the terminal electrodes. Each of the conductor electrodes is formed so that the variation in wiring resistance between a central portion and an end portion of each of the liquid crystal driving circuits and the variation in area occupation ratio per unit area of the wiring disposed below the sealing material are smaller than predetermined allowable values, respectively.

7 Claims, 21 Drawing Sheets

LIQUID CRYSTAL DISPLAY DEVICE SUITED TO NARROW FRAME

TECHNICAL FIELD

The present invention relates to a simple matrix or active matrix type liquid crystal display device and, more particularly, to a liquid crystal display device having lead-out wiring for connecting electrodes of the liquid crystal display device to driving elements.

BACKGROUND ART

For example, a liquid crystal display device comprises a liquid crystal display element (i.e., a liquid crystal display part, a liquid crystal display panel, an LCD or a liquid crystal display panel) in which two insulating substrates (hereinafter referred to as electrode substrates) made of transparent glass are superimposed on each other with a predetermined space therebetween in such a way that their surfaces on which display transparent pixel electrodes, an alignment film and so forth are formed are opposed to each other, both substrates are bonded to each other with a sealing material which is provided in a frame-like shape in a marginal portion between both substrates, a liquid crystal which is hermetically enclosed inside the sealing material between both substrates, the liquid crystal being charged inside the sealing material through a liquid crystal charging port provided in part of the sealing material, and polarizers are provided on the outside of the respective substrates; a backlight disposed below the liquid crystal display element and arranged to supply light to the liquid crystal display element; a driving circuit board for driving the liquid crystal display element, which is disposed outside the marginal portion of the liquid crystal display element; a frame-shaped body which is a molding for holding the above members; a metallic frame in which all the members are housed and a liquid crystal display window is formed; and other associated members.

The liquid crystal display element and the driving circuit board are electrically connected by, for example, a tape carrier package (hereinafter referred to as the TCP) equipped with a semiconductor integrated circuit chip for driving the liquid crystal display element. More specifically, a multiplicity of output terminals of the circuit board and a multiplicity of input terminals (input outer leads) of the TCP are connected by soldering, and a multiplicity of output terminals (output outer leads) of the TCP and a multiplicity of input terminals of the liquid crystal display element which are connected to the respective display electrodes are connected by means of an anisotropic conductive film (such input terminals are formed in an array at an end portion of a surface of one of the transparent glass substrates which constitute the liquid crystal display element, i.e., a surface of one of the electrode substrates). A multiplicity of input terminals of the semiconductor integrated circuit chip provided on the TCP are connected to a multiplicity of output inner leads of the TCP, while a multiplicity of output terminals of the semiconductor integrated circuit chip are connected to a multiplicity of inner leads of the TCP.

Such a liquid crystal display device is described in documents such as Japanese Patent Laid-Open No. 214E48/1986 and Japanese Utility Model Laid-Open No. 137E5/1990.

FIG. 24 is a schematic plan view showing essential portions of part of the wiring formed on an electrode substrate which constitutes a conventional liquid crystal display element, i.e., display electrodes, terminals for connection to electrodes of a TCP, and lead-out wiring for connecting both.

Display electrodes 46 which are made of transparent conductive film and are wired in parallel and constitute pixels are formed on a surface of an electrode substrate (311 or 312) which includes one of insulation substrates which are made of transparent glass and constitute a liquid crystal display element (no shown in FIG. 24. See reference numeral 18 of FIG. 13). Reference numerals 41 denote terminals (connecting electrodes) connected to the terminals (the output outer leads) of a TCP which is a driver element (not shown in FIG. 24. See reference numeral 74 or 77 of FIG. 13). Reference numerals 45 denote oblique straight wiring which are lead-out wiring which connects the display electrodes 46 and the terminals 41, respectively. Reference numeral 40 denotes the center line of a terminal group which corresponds to a single TCP mounted on the electrode substrate 311 or 312, and reference numeral 44 denotes a portion in which a sealing material is provided.

Conventionally, in the electrode substrate (311 or 312) which constitutes the liquid crystal display element, the array pitch of the electrodes of the TCP, i.e., the pitch of the terminals 41 connected to the terminals of the TCP is made narrower than the array pitch of the display electrodes 46 wired in parallel. Accordingly, the lead-out wiring which connect the display electrodes 46 and the terminals 41 are formed as the oblique straight wiring 45. As shown in FIG. 24, in the case of the conventional lead-out wiring, both the angle of each conductor of the oblique straight wiring 45 (to the corresponding display electrode 46 or terminal 41) and the width of each conductor of the oblique straight wiring 45 are adjusted so that the wiring resistances of the respective conductors of the lead-out wiring become equal. Such a pattern of lead-out wiring is called radial wiring.

Such prior art has the following problems.

One problem is that the area use efficiency (wiring efficiency) of the lead-out wiring on the electrode substrate 312 is low, their lengths are large and their wiring resistances are large. If the lead-out wiring are intended to be shortened, the width of each conductor of the lead-out wiring must be made narrow so as to provide a clearance (space) between each conductor of the lead-out wiring, so that the problem of an increase in wiring resistance occurs. Presently, the wiring resistances of lead-out wiring are, for example, 500 Ω to 1 kΩ, and are large compared to 500–700 Ω which are the output resistances of driving semiconductor IC chips.

In addition, there is a vacant space between each group of the terminals 41 connected to the terminals (electrodes) of a plurality of TCPs which are installed in a line on an end portion of an electrode substrate, and since the terminals are made of, for example, ITO (indium-tin-oxide; Nesa) film, a difference in height between the area in which the terminals are present and the area in which the terminals are absent is produced by the film thickness of the terminals. The ITO film is as thick as 0.2–0.5 $\mu$m. This leads to the problem that during mass-production of liquid crystal display elements, such uneven shape is transferred to a rubbing roller for subjecting alignment treatment (rubbing) to an alignment film formed on the display electrodes, and if such rubbing roller is used to perform alignment treatment, uneven rubbing grooves are formed in the alignment film and the display quality is lowered.

Furthermore, since the oblique straight conductors 45 of the lead-out wiring are radially wired, the spaces between the conductors of the oblique straight wiring 45 becomes nonuniformly narrower from the display electrodes 46 toward the terminals 41 as shown in FIG. 24. This leads to the problem that nonuniform shading occurs in a portion which originally needs to be uniformly black, within a so-called frame portion which is a non-lighting portion outside the display portion (a lighting portion) and inside a sealing material 44 (on the side where a liquid crystal is present) in a finished liquid crystal display element.

Furthermore, since the display electrodes 46 of the display portion are wired in parallel at equal intervals, the wiring density of the display electrodes 46 is uniform, whereas the oblique straight wiring conductors 45 which are radially wired as described above is not uniform in wiring density. In particular, a liquid crystal display device such as an STN-LCD (super twisted nematic LCD) which needs a high-precision gap (±0.1 μm) between both electrode substrates is greatly affected by the effective density at which a spacer for creating the gap functions.

Accordingly, since the conventional radial oblique straight wiring conductors 41 is generally lower in wiring density than the display portion, uneven color occurs due to the variation in the gap in the frame portion. As described previously, the transparent electrodes are generally made of ITO film as thick as 0.2–0.3 μm, and the spacer is supported by the display electrodes 46 and the oblique straight wiring conductors 45 which is made of ITO film on each of the upper and lower electrode substrates. This leads to the problem that the spacer becomes free in a portion in which no electrodes are present and gap control becomes ineffective.

Such an art is described in documents such as Japanese Patent Laid-Open Nos. 289626/1991, 70627/1992, 170522/1992, 369622/1992 and 127181/1993.

Although not known, the invention made by Fujii et al has been filed as a prior application (Japanese Patent Laid-Open Nos. 214785/1994) by the same applicant with respect to a liquid crystal display device having lead-out wiring conductors whose area use efficiency is high and each conductor of which has a short length and a low resistance.

Therefore, a first object of the present invention is to provide a liquid crystal display device suited to a narrow frame, which has an uniform black non-lighting area free of nonuniform shading in a frame portion, by optimizing the area occupation ratio of each ITO below a seal portion between a central portion and an end portion of each ITO.

A second object of the present invention is to provide a liquid crystal display device suited to a narrow frame, by generally taking account of the uniformalization of the gap near a frame portion and the uniformalization of the resistance of each ITO.

DISCLOSURE OF THE INVENTION

To achieve the above objects, the present invention provides a liquid crystal display device suited to a narrow frame which comprises a pair of liquid crystal display element substrates which are opposed to each other with a liquid crystal sandwiched therebetween with a sealing material; and a plurality of liquid crystal driving elements connected to the wiring formed on each of the liquid crystal display element substrates, for driving the liquid crystal, each of the liquid crystal display element substrates including a plurality of display electrodes wired in parallel, a plurality of parallel terminal electrodes led out to an end of each of the liquid crystal display element substrates and connected to each of the liquid crystal driving elements, approximately parallel oblique straight wiring electrodes for connecting the display electrodes and the terminal electrodes, respectively, and a plurality of dummy electrodes disposed approximately parallel to the terminal electrodes between the terminal electrodes in at least a central portion of each of the liquid crystal driving circuits, each of the conductor electrodes being so formed that the variation in wiring resistance between the central portion and an end portion of each of the liquid crystal driving circuits and the variation in area occupation ratio per unit area of the wiring disposed below the sealing material being smaller than predetermined allowable values, respectively.

In particular, it is important that the variation in area occupation ratio per unit area of the wiring disposed below the sealing material is 3% or below.

Furthermore, it is important that the variation in wiring resistance of the central portion and the end portion of each of the liquid crystal driving circuits is 4.5% or below.

The present invention is most effective in a narrow-frame liquid crystal display device in which the distance from an outside vicinity of the sealing material to the pixels in the lighting area is approximately 2.75 mm or below.

Incidentally, normally, a dummy color filter layer for several pixels is also provided inside the sealing material in an outside area to which a voltage for maintaining a uniform gap is not applied, and the pixels in the lighting area are those inside the dummy color filter layer.

BEST MODE FOR CARRYING OUT THE INVENTION

Figure 1:
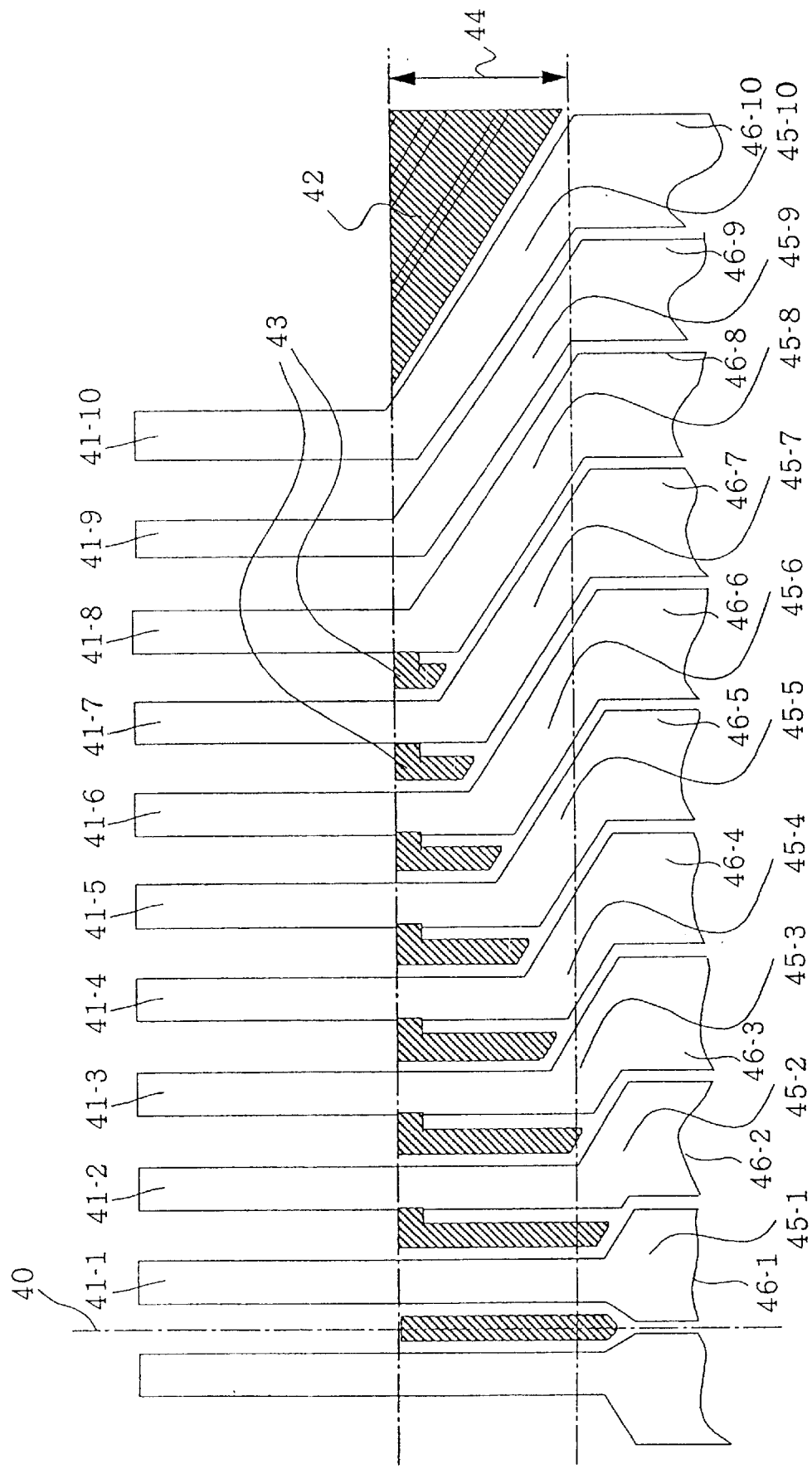
FIG. 1 is a view illustrating a wiring pattern for a liquid crystal display device according to the present invention.

FIG. 1 is a plan view of part of an electrode substrate which constitutes a liquid crystal display device according to the present invention, and is a schematic plane view showing part of lead-out wiring which is provided on the right side of the center line of terminals which correspond to a single TCP mounted on the electrode substrate fabricated in accordance with an optimum algorithm according to the present invention.

Figure 4:
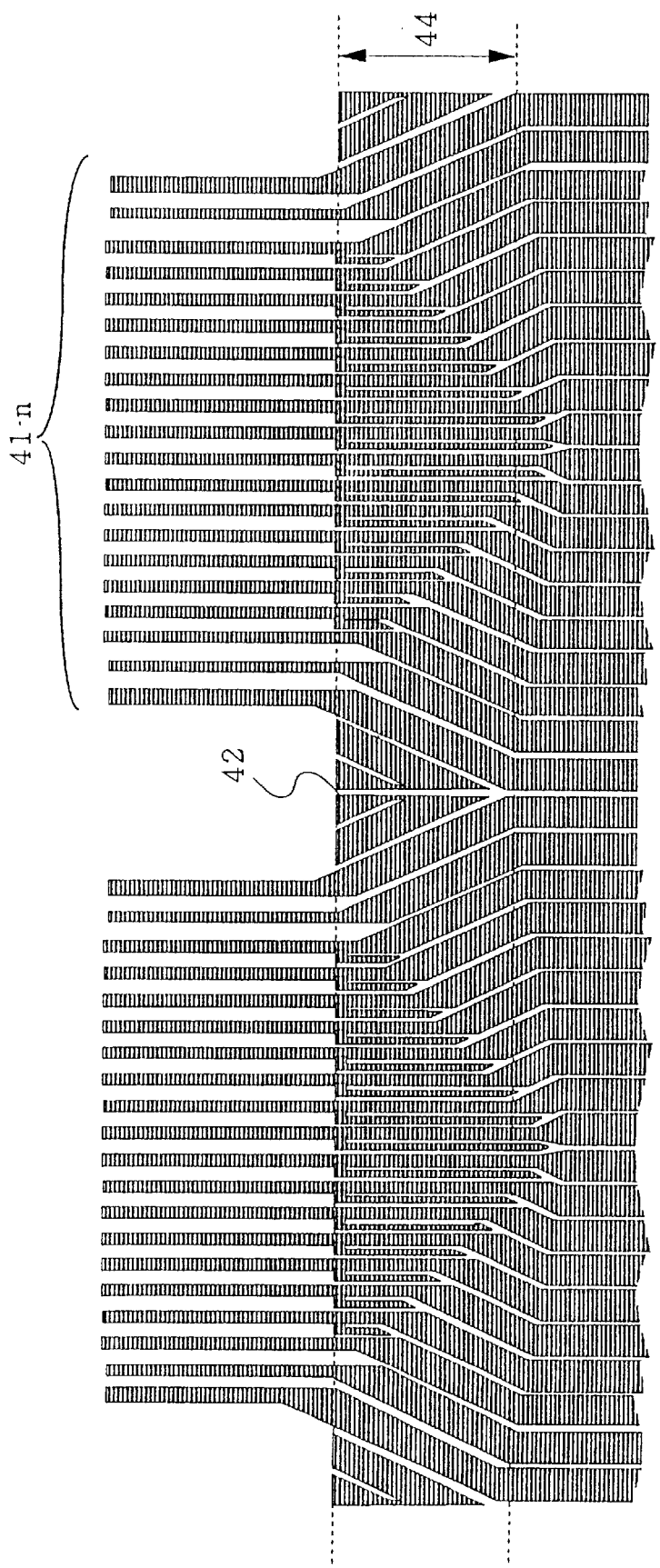
FIG. 4 is a view illustrating a layout of the wiring pattern shown in FIG. 1 for two TCPs.

A single TCP (tape carrier package) which is a driver element ordinarily has about 80 to 160 electrodes, but only 10 of the electrodes of the embodiment are shown for the sake of simplicity of illustration. The arrangement of the lead-out wiring according to the present invention can be applied to different numbers of electrodes. FIG. 4 shows a plan view of an area which is about four times that shown in FIG. 1.

Disposed on one electrode substrate which includes one insulating substrate made of transparent glass which constitutes part of the liquid crystal display device, are display electrodes 46-1 to 46-10 which are made of transparent conductive film and wired in parallel to constitute pixels, terminal electrodes (connection electrodes, i.e., input electrodes) 41-1 to 41-10 connected to the electrodes (output outer leads) of the TCP, and oblique straight wiring electrodes 45-*n* which are part of the terminal lead-out wiring which connects the display electrodes 46-*n* and the terminal electrodes 41-*n*.

Reference numeral 72 denotes the center line of the terminals which correspond to the single TCP mounted on the electrode substrate, and reference numeral 44 denotes a portion in which to provide a sealing material.

Figure 8:
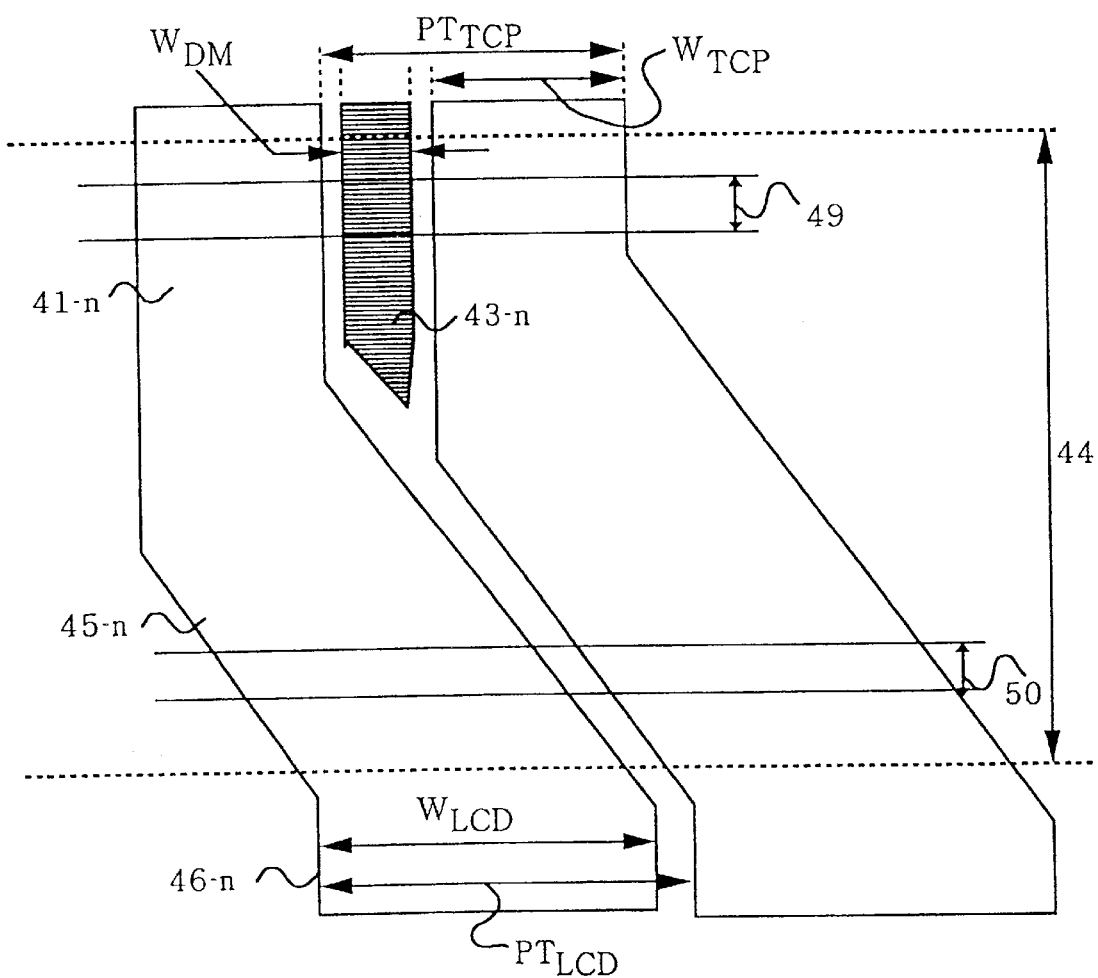
FIG. 8 is a view illustrating the concept for calculating the uniformalization of the area occupation ratio of electrodes including dummy electrodes.

The pitch of the terminal electrodes 41-1 to 41-10 of the respective display electrodes which are extended to an end of the electrode substrate connected to the TCP is narrower than the pitch of the plurality of display electrodes 46-1 to 46-10 which are wired in parallel on the electrode substrate. Accordingly, the lead-out wiring conductors 45-1 to 45-10 for connecting both are needed. Each of the lead-out wiring conductors includes a portion extended directly from the corresponding one of the display electrodes, a portion extended directly from the corresponding one of the terminal electrodes, and the corresponding one of the oblique straight conductors 45-1 to 45-10 which connects the two extended portions. The oblique straight conductors 45-1 to 45-10 have an equal angle θ with respect to the display electrodes 46-1 to 46-10 and the terminal electrodes 41-1 to 41-10, i.e., are parallel to one another. The length of each of the two extended portions and the width of each of the oblique straight conductors are so determined that the wiring resistances of the respective extended conductors become equal within a predetermined range and the non-uniformity of the area occupation ratio to be described later with reference to FIG. 8 is within a predetermined range.

Four basic conditions for wiring are as follows.

All the oblique straight wiring conductors 45-1 to 45-10 are parallel conductors inclined at an angle θ (on the left side of a center line 40, −θ), and are axi-symmetric with respect to the center line 40. The angle θ is, for example, 25–50°.

The distance between the oblique straight wiring conductors 45-1 to 45-10 conforms to Wiring Rule d TCP. No margin is provided.

Each of the terminal electrodes 41-*n* is equal in width over its entire length, inclusive of its extended portion. The terminal electrodes 41-*n* and the display electrodes 46-*n* are parallel (perpendicular to the terminal lead-out end of the electrode substrate of the liquid crystal display device). The distance between the terminals conforms to TCP Pressure-Bonding Rule d TCP.

Each of the display electrodes 46-*n* is equal in width over its entire length, inclusive of its extended portion. The distance between the display electrodes 46-*n* conforms to TCP Pressure-Bonding Rule d T(CP.

Figure 2:
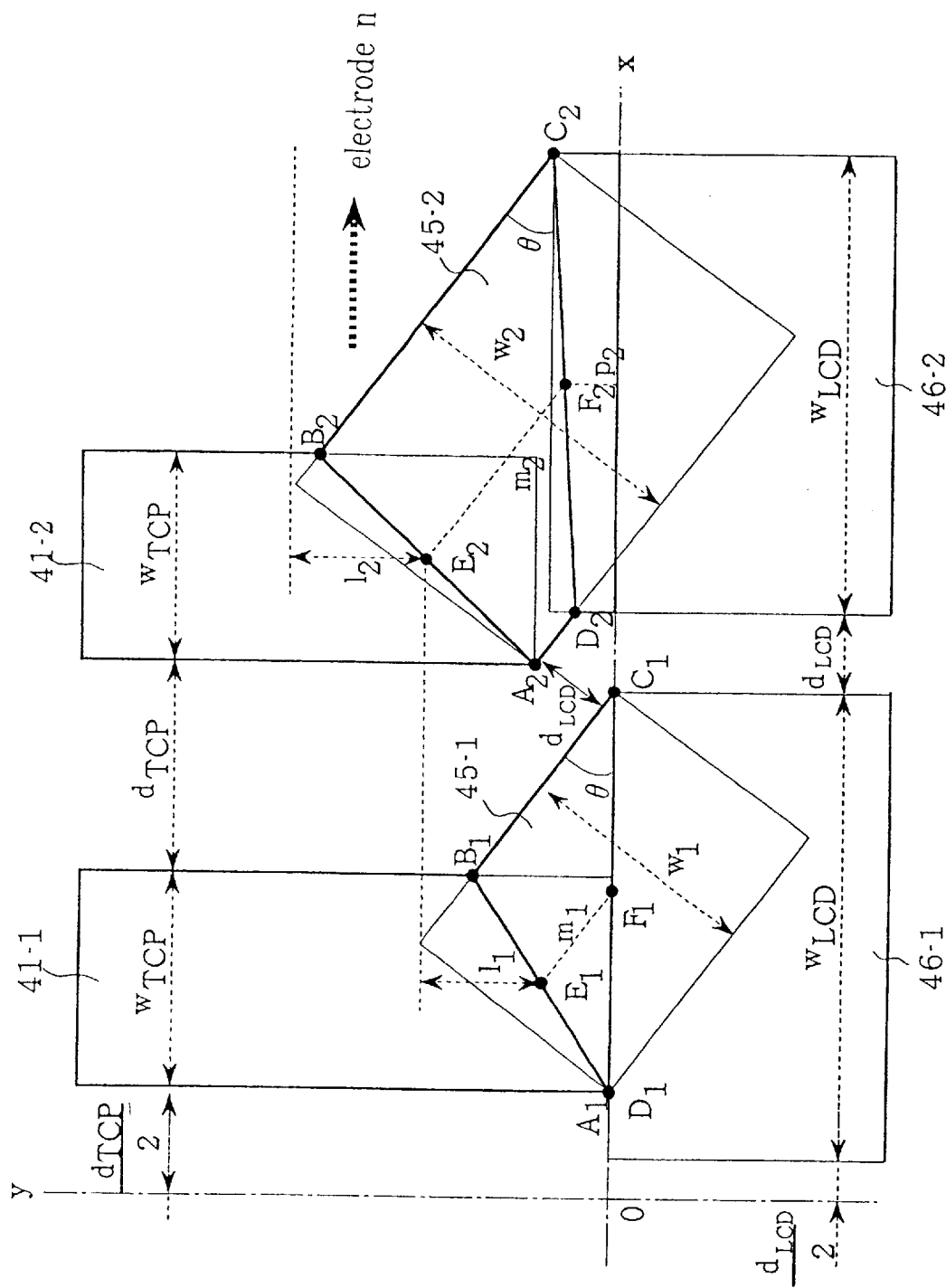
FIG. 2 is a view illustrating the concept of the connection relationships between two display electrodes, terminal electrodes and oblique wiring electrodes in a central portion of the liquid crystal display device according to the present invention.
Figure 3:
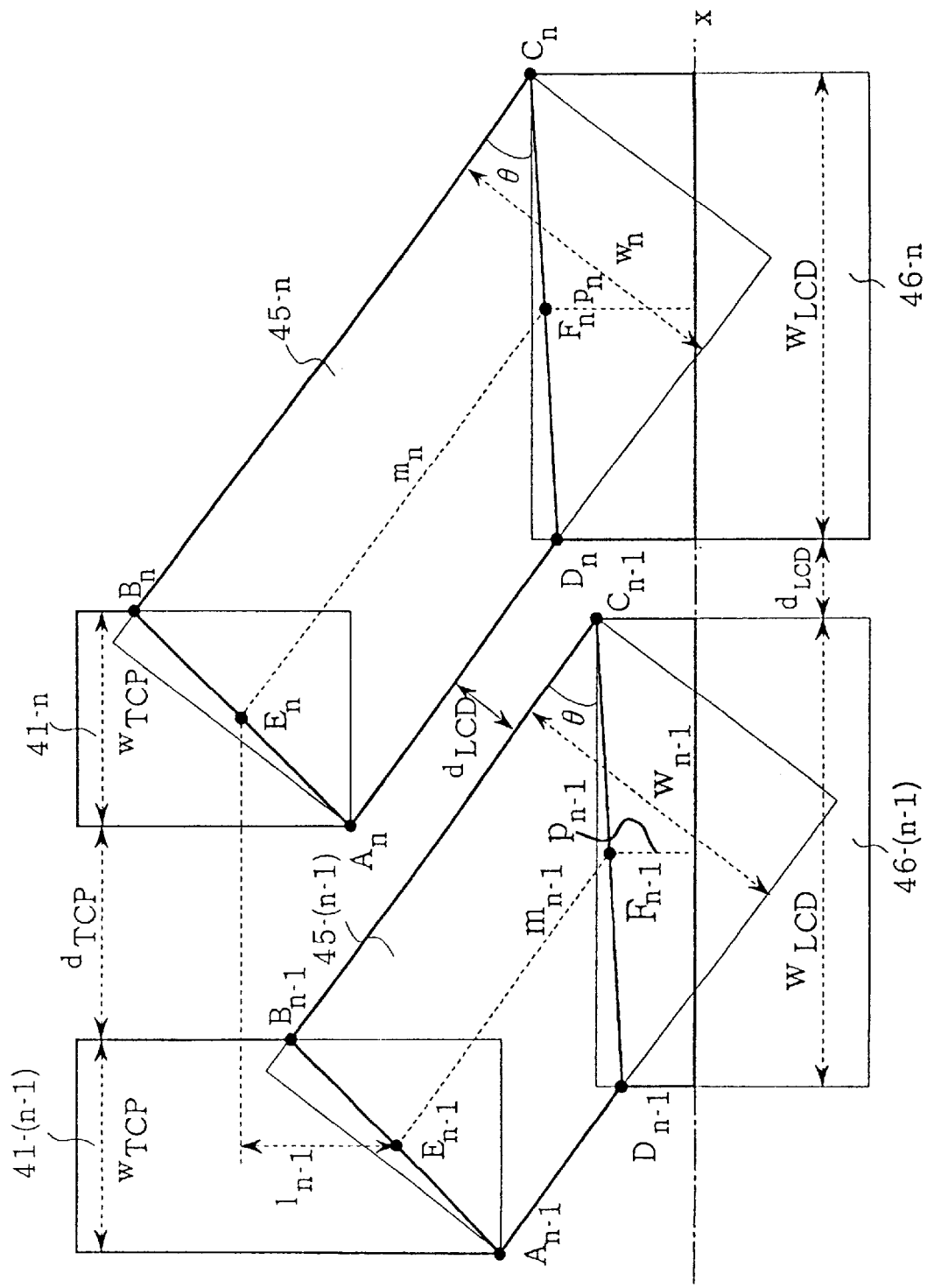
FIG. 3 is a view illustrating the concept of the connection relationships between two display electrodes, terminal electrodes and oblique wiring electrodes in an arbitrary portion of the liquid crystal display device according to the present invention.

The arrangement of the lead-out wiring conductors 45-*n* will be described below in detail with reference to FIGS. 2 and 3.

An algorithm for wiring has the following sequence.

(1) First, the first lead-out wiring conductor on the right side of the center line 40 straightforwardly connects the display electrode 46-1 and the terminal electrode 41-1.

(2) A line is drawn at an arbitrary angle θ from an end C1 of the display electrode 46-1.

(3) The intersection of the line drawn at the angle θ from C1 and an extended line of the terminal electrode 41-1 is named B1.

(4) A2 is found so that the distance between an extended line of the terminal electrode 41-2 and a line segment B1-C1 is d LCD.

(5) A line (a line parallel to the line segment B1-C1) is drawn from A2 at the angle θ, and the intersection of the line and an extended line of the display electrode 46-2 is named D2.

(6) The width w1 of the oblique straight wiring conductor 45-1 is arbitrarily determined.

(7) A line spaced a distance w2 apart from a line segment A2-D2 (a line parallel to the line segment A2-D2) is drawn, and the intersection of the line and an extended line of the terminal electrode 41-2 is named B2, and the intersection of the line and an extended line of the display electrode 46-2 is named C2.

(8) The midpoint of a line segment A1-B1 is named E1, the midpoint of a line segment D1-C1 is named F1, the midpoint of a line segment A2-B2 is named E2, and the midpoint of a line segment D2-C2 is named F2. The distance between E1 and E2 along the y axis is namded l1, the length of a line segment E1-F1 is named m1, the length of a line segment E2-F2 is named m2, and the y-axis component of F2 is named P2.

(9) The width w2 of the oblique straight wiring conductor 45-2 from among the lead-out wiring conductors is found on a predetermined condition. Specifically, w2 is found on the condition that the wiring resistances of the first and second lead-out wiring conductors be equal. W TCP denotes the width of each of the terminal electrodes 41-n which is determined according to the width of the corresponding elect—ode of a TCP, and W LCD denotes the width of each of the display electrodes 46-n.

Since specific numerical expressions are described in a prior application (Japanese Patent Application No. 214785/1994), the details of the numerical expressions are omitted herein and only the concept thereof will be described below.

(10) B2 and C2 which are determined by w2 found by the above-described method are made final coordinates.

(11) The first and second lead-out wiring conductors are determined in the above-described manner.

(12) Then, the third lead-out wiring conductor is determined by a method similar to the method described in the above items (2) to (10). However, the calculating expression disclosed in the above prior application is used as an expression for calculating a width w3 of the oblique straight wiring conductor 45-3.

(13) The above-described sequence is repeated until the n-th lead-out wiring conductor is found. The width wn of the oblique straight wiring conductor 45-n is found by using the calculating expression disclosed in the above prior application.

(14) When coordinates An, Bn, En and Dn for the last n-th lead-out wiring conductor are determined, the wiring resistance R of the n-th lead-out wiring conductor can be found from a predetermined calculating expression.

$$R = \left( \frac{1}{W_{TCP}} + \frac{m_n}{W_n} + \frac{p_n}{W_{LCD}} \right) R_{sq}$$

where Rsq is the sheet resistance (Ω/□) of the electrode wiring material.

Incidentally, the present invention is characterized in that the left-hand side and the right-hand side of the expression are not completely equal within an allowable range in which the difference between R(max) which is the highest resistance and R(min) which is the lowest resistance is 4.5% or lower as compared with R(min).

(15) The coordinates Bn for the n-th lead-out wiring conductor determine the y-axis height of the entire oblique straight wiring conductor pattern. Specifically, for the first to (n−1)st lead-out wiring conductors, the terminal electrodes 41-1 to 341-n−1 are extended on the basis of Bn. Then, all the wiring resistances of the first to n-th lead-out wiring conductors are equal to R. (16) Finally, numerical calculation which uses the angle θ as a variable is performed, and the wiring resistance θ which minimizes the wiring resistance R is found. The coordinates A1, B1, E1 and D1 to An, Bn, En and Dn for the first to n-th lead-out wiring conductors are diagramed.

In the case of the lead-out wiring conductors formed in the above-described manner, since the area use efficiency (wiring efficiency) of the lead-out wiring conductors can be improved, the lengths of the lead-out wiring conductors can be shortened, and consequently the conventional wiring resistance of 500 Ω to 1 kΩ can be reduced by 30–40%. In addition, since the amount of the reduction can be used as the margin of the on resistance of a driving semiconductor IC chip, the size of the semiconductor IC chip can be reduced. In addition, since the lengths of the lead-out wiring conductors can be made shorter than conventional lengths, the size of the liquid crystal display device can be made small. Accordingly, the manufacturing costs can be reduced. Furthermore, since the rounding of a waveform for driving a liquid crystal or distortion due to crosstalk can be reduced owing to a decrease in wiring resistance, shadowing (uneven luminance) can be reduced to improve the display quality.

Figure 7:
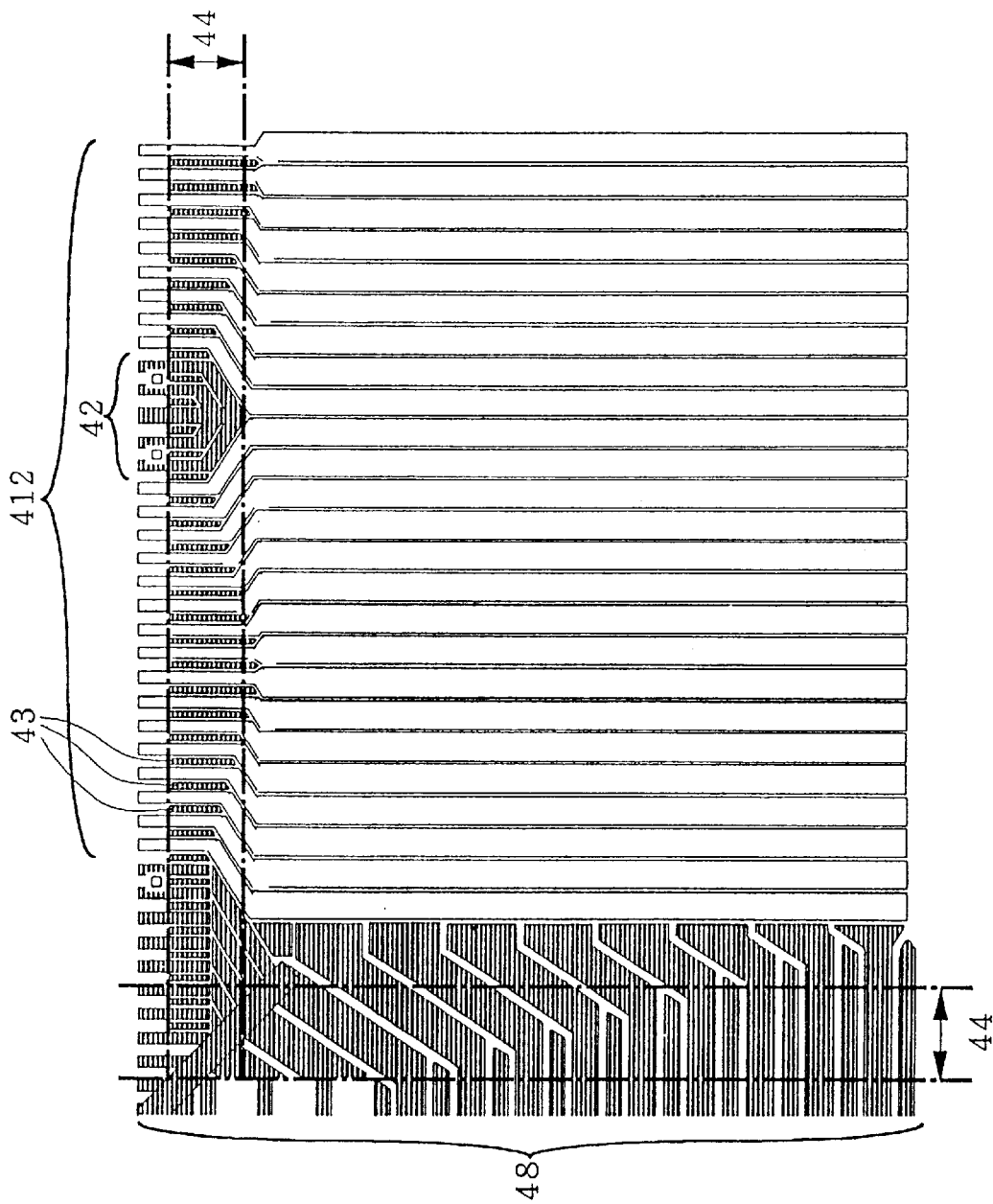
FIG. 7 is an enlarged view of an end portion of the wiring pattern shown in FIG. 5B.

Reference numeral 42 denotes a dummy electrode which is provided in each of the spaces between groups of terminals 3 which respectively correspond to groups of terminal electrodes (see reference numeral 30 in FIG. 7 (B)) for connection to a plurality of TCPs (refer to FIG. 4). This dummy electrode 42 has the shown shape which buries the space, i.e., includes parallel electrodes which are equal in pitch and width to the terminal electrodes 41-n, and oblique straight electrodes. The oblique straight electrodes are equal in angle and pitch to the oblique straight conductors 45-n and are provided between the oblique straight wiring conductors 45-n of outermost adjacent ones of the terminal electrodes 41-n. In the present embodiment, the dummy electrode 42 is of from an ITO film and is in a floating state.

Conventionally, since there is a vacant space between the groups of terminal electrodes 41-n connected to the plurality of TCPs, a difference in height is produced between a portion in which the terminal electrodes 41-n are present and a portion in which the terminal electrodes 41-n are absent, owing to the film thickness of the terminal electrodes 41-n made of, for example, an ITO film as thick as 0.2–0.3 μm. This leads to the problem that during mass-production of liquid crystal display devices, such shape is transferred to a rubbing roller for applying alignment treatment (rubbing) to an alignment film formed on the display electrodes 46-n and if this rubbing roller is used to perform the alignment treatment, uneven rubbing grooves are formed in the alignment film and the display quality is lowered. However, in the present embodiment, since the spaces between the TCPs (the spaces between the groups of terminals 41-n are filled with the dummy electrodes 42, the condition of such space can be made equal to unevenness conditions, i.e., rubbing conditions on both sides of the space. Accordingly, unlike the prior art, uneven rubbing grooves are not formed, and the display quality can be improved.

In addition, since recesses of about 2.0 μm between the TCPs can be eliminated by providing the dummy electrode 42 in the spaces between the TCPs, the gap between upper and lower substrates can be made uniform. Accordingly, it is possible to realize a uniform black non-lighting area free of uneven shading in a frame portion, and since the gap between both substrates can be precisely controlled, uneven color can be prevented from occurring and the display qualify can be improved.

As shown in FIG. 1, dummy electrodes 43 are provided in the spaces between the terminal electrodes 41-n within the area of the sealing material 44 of the liquid crystal display device and within the so-called frame portion which is a non-lighting portion outside the display portion (the lighting portion) in which the electrodes of the upper and lower electrode substrates intersect. The pitches between the dummy electrodes 43 are uniform, and the distances between the dummy electrodes 43 and the adjacent opposite terminals 41-n (the lengths of the spaces between both) are equal, and are respectively equal to the distances between adjacent ones of the oblique straight wiring conductors 45-n in the present embodiment. In addition, although in the present embodiment each of the dummy electrodes 43 is made of an ITO film and is electrically connected to the end of the above terminal electrode outside the sealing material 44, each of the dummy electrodes 43 may be in a floating state.

In the present embodiment, since the dummy electrodes 43 are respectively provided in the spaces between the terminals 41-n within a portion which contains the frame portion, it is possible to prevent light from leaking through the gaps between the terminal electrodes 41-n of the frame portion. In addition, the in-plane densities of portions of the terminal electrodes 41-n and extended portions thereof become uniform so that the gap between the upper and lower substrates can be made uniform.

Figure 24:
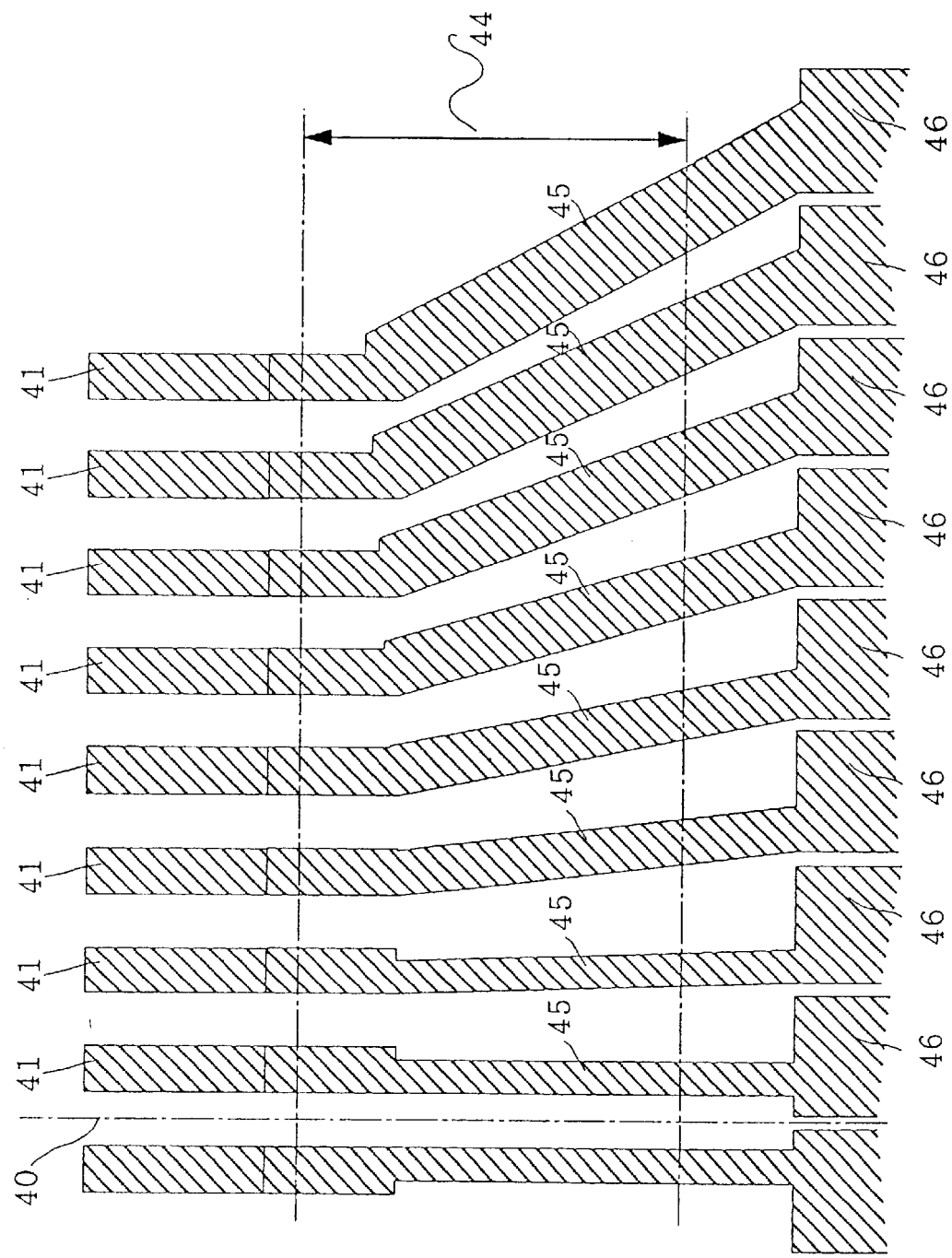
FIG. 24 is a view illustrating a conventional conductor pattern.

As shown in FIG. 24, the prior art has the problem that since oblique straight wiring conductors is 45 of the lead-out wiring are radially formed, the spaces between the oblique straight wiring conductors 45 become non-uniformly narrower from display electrodes 2 toward the terminals 3, so that non-uniform shading occurs in the frame portion which 40 originally needs to be uniformly black. However, in the present embodiment, since the dummy electrodes 42 and 43 are provided, the gap in the frame portion can be made uniform to solve such problem, whereby the frame portion can be made uniformly black to improve the display quality.

Furthermore, the conventional liquid crystal display device has the problem that since a spacer is supported by display electrodes 46 and the oblique straight wiring conductors 45 all of which are formed of an ITO film as thick as 0.2–0.3 μm on each of the upper and lower electrode substrates, the spacer becomes free in the portion in which no electrodes are present and the gap control becomes ineffective, and further, since the conventional radial oblique straight wiring conductors 45 are not uniform in wiring density as described above, uneven color occurs due to the variation in the gap in the frame portion.

In particular, an STN-LCD which needs a high-precision gap (±0.1 μm) between both electrode substrates is greatly affected by the effective density at which the spacer for creating the gap is present.

In the present embodiment, since the dummy electrodes 42 and 43 are provided, the gap in the frame portion can be made uniform to solve this problem, whereby the uneven color due to the variation in the gap in the frame portion can be prevented to improve the display quality.

Figure 5A:
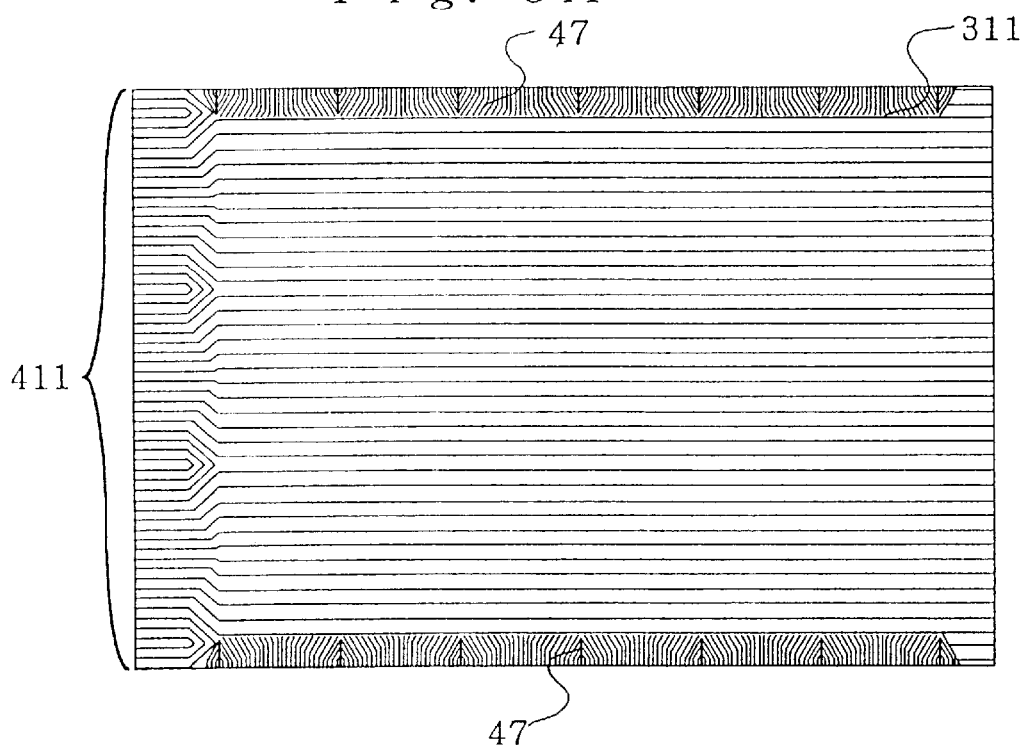
FIG. 5A is a plan view showing the wiring pattern of a scanning electrode substrate (an upper substrate) of the liquid crystal display device according to the present invention.
Figure 5B:
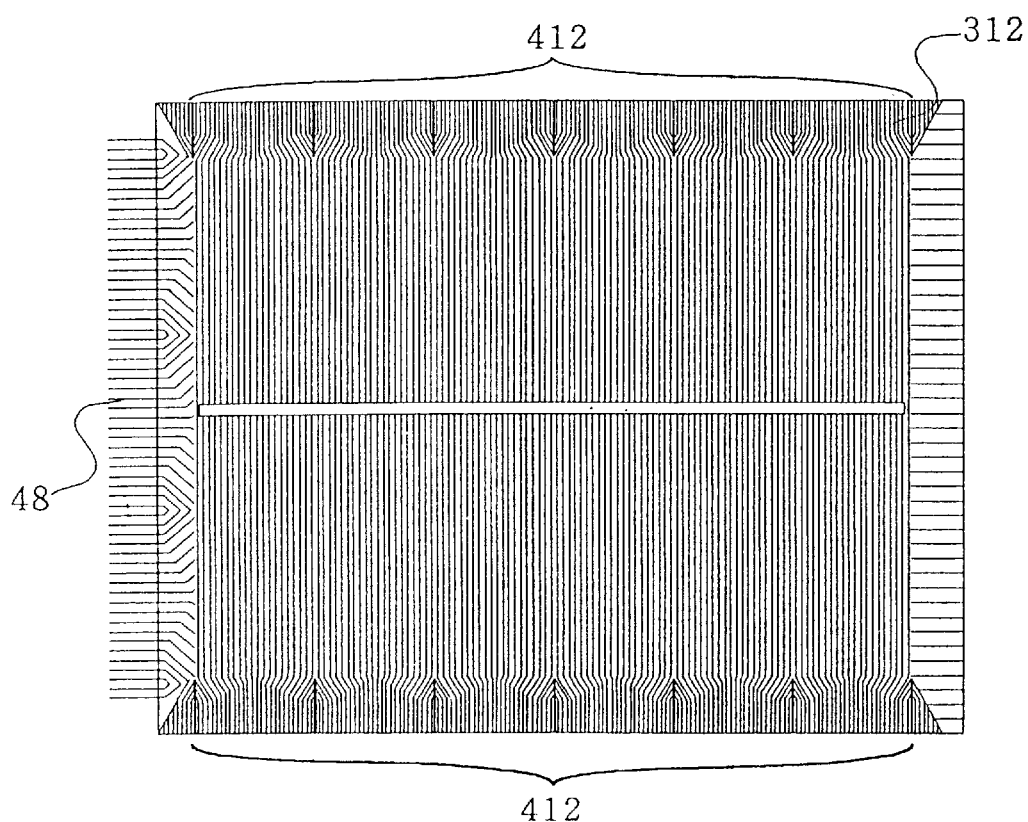
FIG. 5B is a plan view showing the wiring pattern of a signal electrode substrate (a lower substrate) of the liquid crystal display device according to the present invention.

FIGS. 5A and 5B are schematic plan views showing an upper electrode substrate (FIG. 5A) and a lower electrode substrate (FIG. 5B) which are prepared by applying electrodes which include lead-out wiring conductors and dummy electrodes according to the present invention to the upper and lower electrode substrates, superimposing both substrates on each other to assemble them, and providing duplicate dummy electrode patterns in such a way that dummy electrodes having the same shape are opposed to each other.

In this manner, terminals, the lead-out wiring conductors and dummy electrodes 47 and 48 formed at the end portions of either of the two electrode substrates 311, 312 are formed on the opposed surface of the other electrode substrate 311, 312. Accordingly, since the gap between both electrode substrates 311 and 312 can be made uniform, the frame portion can be made uniformly black, and further, the uneven color due to the variation in the gap in the frame portion can be prevented to improve the display quality.

Figure 6:
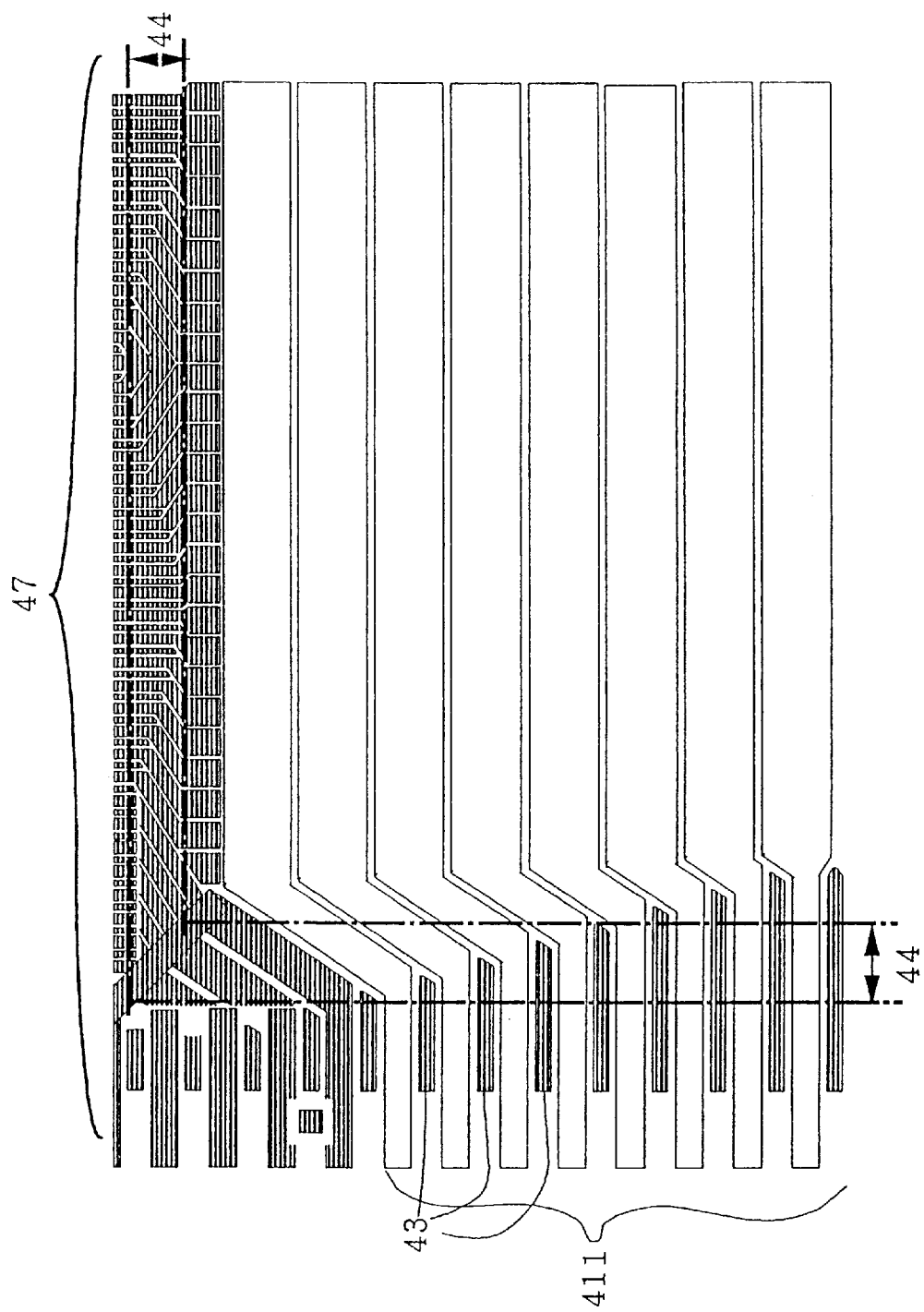
FIG. 6 is an enlarged view of an end portion of the wiring pattern shown in FIG. 5A.

FIG. 6 is a detailed enlarged view of FIG. 5A, and FIG. 7 is a detailed enlarged view of FIG. SB.

In the present embodiment, circuit elements outside an effective display area (constituted by a portion in which the upper electrodes 311 and the lower electrodes 312 intersect, when viewed in a direction perpendicular to the surfaces of both substrates 311 and 312), that is to say, part of upper and lower electrodes 411 and 412, part of their terminals, lead-out wiring conductors which connect both (these three portions are hereinafter referred to as a terminal portion), at least part of the dummy electrodes 43 provided between terminal groups and at least part of the dummy electrodes 42 provided between terminals are duplicated on the opposed surfaces of the end portions of the opposed substrate. The duplicate electrode patterns are duplicated as patterns which are identical to and completely superimposed on the original electrode patterns, when viewed in a direction perpendicular to the substrate surfaces of a finished liquid crystal display device. Reference numerals 47 and 48 denote the duplicate terminal portions.

The duplicate terminal portion (dummy electrodes opposed to signal driver electrodes) 47 are duplicated on the surface of an end portion of the upper electrode substrate 311, and part of the terminal portion of the lower electrodes 412 on the surface of an end portion of the lower electrode substrate 312 opposed to the upper electrode substrate 311 is duplicated in an identical pattern with an identical material.

The duplicate terminal portion (dummy electrodes opposed to scanning driver electrodes) 48 are duplicated on the surface of an end portion of the lower electrode substrate 312, and part of the terminal portion of the upper electrodes 411 on the surface of an end portion of the upper electrode substrate 311 opposed to the lower electrode substrate 312 is duplicated in an identical pattern with an identical material.

The duplicate terminal portions 47 and 48 are placed in an electrically floating state so that the liquid crystal between the duplicate terminal portion and the opposed terminal portion is not turned on. Incidentally, if the dummy electrodes 42, 43 in the opposed terminal portions are opposed to each other, the dummy electrodes 42, 43 may be placed in an electrically floating state so that the liquid crystal between both is not turned on. Thus, even if charge is stored in the dummy electrodes 42 and the like owing to static electricity or the like, the charge is discharged by the high-resistance leak of the liquid crystal, whereby the liquid crystal can be prevented from being turned on.

FIG. 8 is a view illustrating the area occupation ratio of transparent electrodes below the sealing material.

As shown, arbitrary unit widths (49 and 50) are determined and the area occupation ratio is calculated as follows.

(1) First, the area occupation rate Sq1 of the portion (49) through which the dummy electrodes 43 are extended is calculated. In this case, letting $W_{DM}$ be the width of each dummy electrode 43-n, letting $W_{TCP}$ be the width of each of the terminal electrodes 41-n, letting $PT_{TCP}$ be the pitch of the terminal electrodes 41-n, letting $PT_{LCD}$ be the pitch of the display electrodes 46-n and letting $W_{LCD}$ be the width of each of the display electrodes 46-n, the area occupation ratio Sq1 is given by $$Sq1 = (W_{DM} + W_{TCP})/PT_{TCP}$$

(2) Then, the area occupation ratio Sq2 of the portion of the oblique wiring electrodes 45-n is calculated.

$$Sq2 = W_{LCD}/PT_{LCD}$$

(3) The thus-obtained area occupation ratios should satify the following relation for an arbitrary n.

$$Sq2 - Sq1 \leq 0.03.$$

Figure 9:
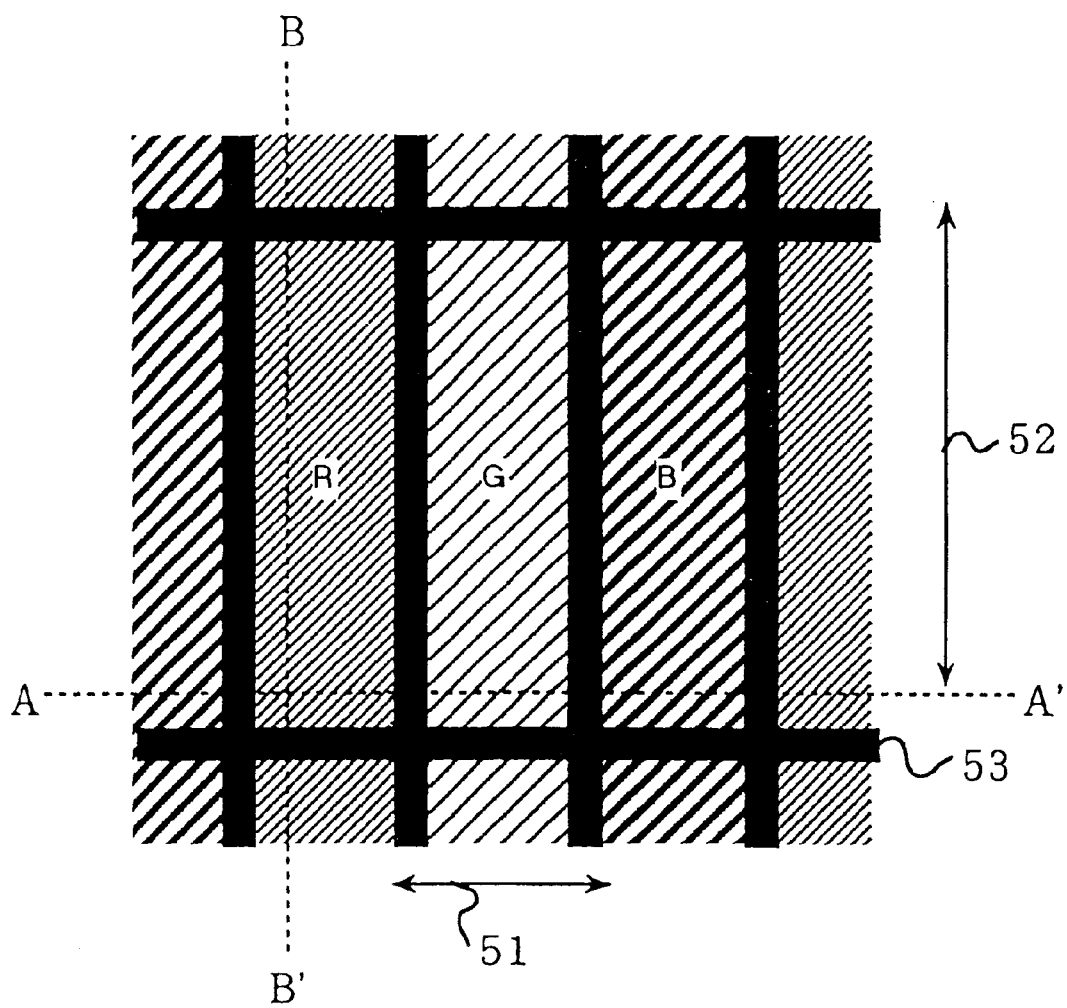
FIG. 9 is a plan view showing the relationship between a color filter layer and the extending directions of scanning electrodes and signal electrodes.
Figure 10A:
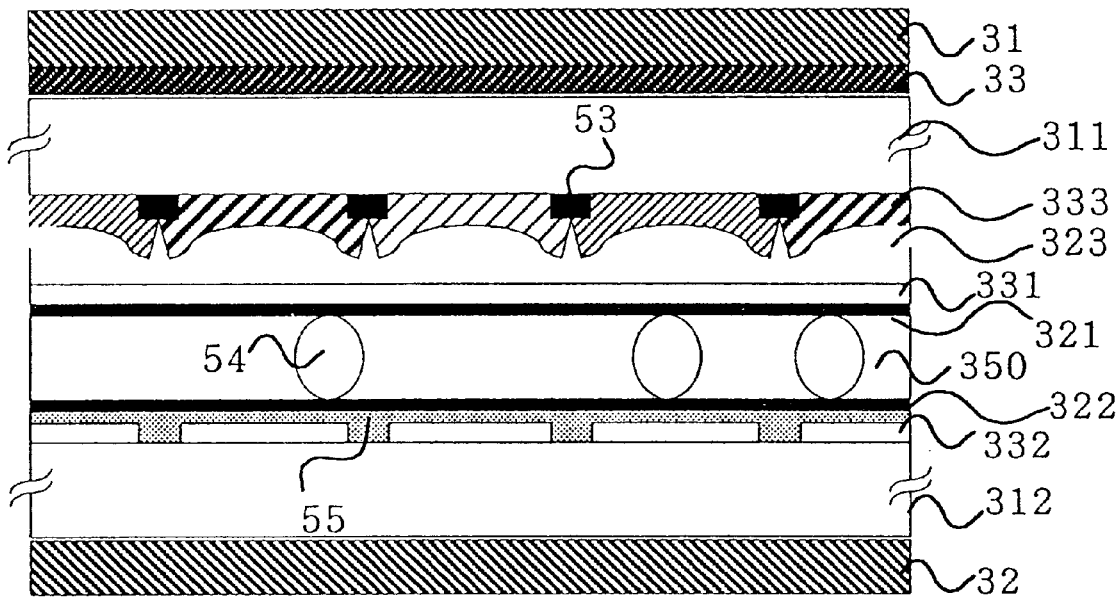
FIG. 10A is a cross-sectional view taken along line A–A' of FIG. 9.
Figure 10B:
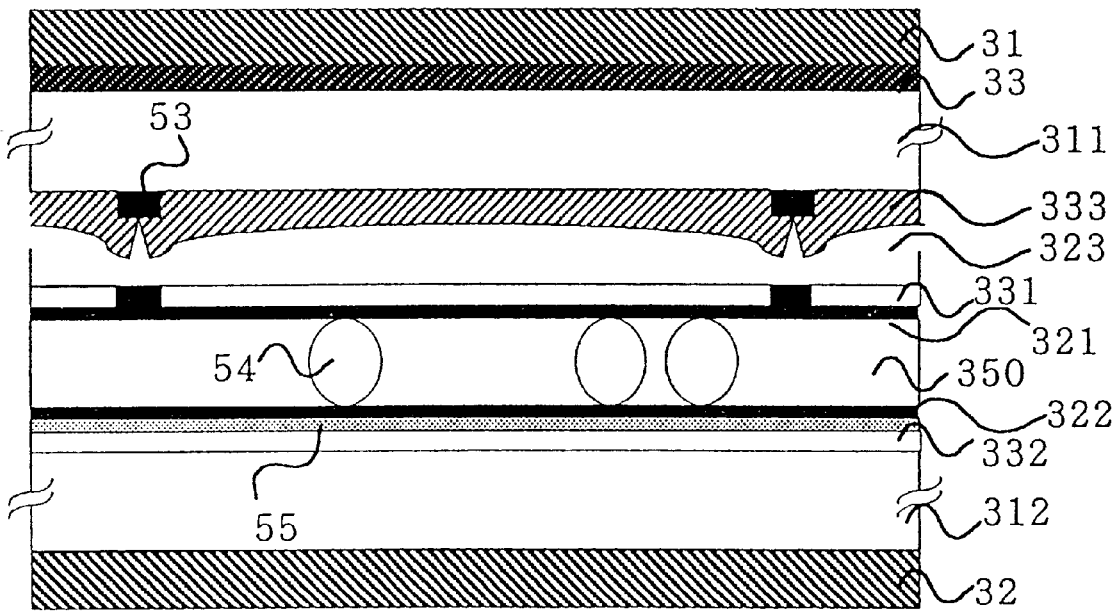
FIG. 10B is a cross-sectional view taken along line B–B' of FIG. 9.

FIG. 9 is a plan view of the essential portions of a liquid crystal display element to which the present embodiment is applicable, and FIGS. 10A and 10B are cross-sectional views taken along lines A–A' and B–B' of FIG. 9, respectively.

As shown in FIG. 9, each pixel is surrounded by a grid-shaped black matrix 53, and scanning electrodes are extended in a direction 51, while signal electrodes are extended in a direction 52.

In FIG. 10A, reference numeral 31 denotes an upper polarizer, 33 a phase-difference plate, 311 an upper electrode substrate, 333 color filters, 53 a black matrix, 323 a flattening film, 331 scanning electrodes, 321 an upper alignment film, 350 a liquid crystal layer, 54 a spacer gap material, 322 a lower alignment film, 55 an insulation film, 332 signal electrodes, 312 a lower electrode substrate, and 32 a lower polarizer.

Since the reference numerals are identical to those shown in FIG. 10B, the description thereof will be omitted.

Figure 11:
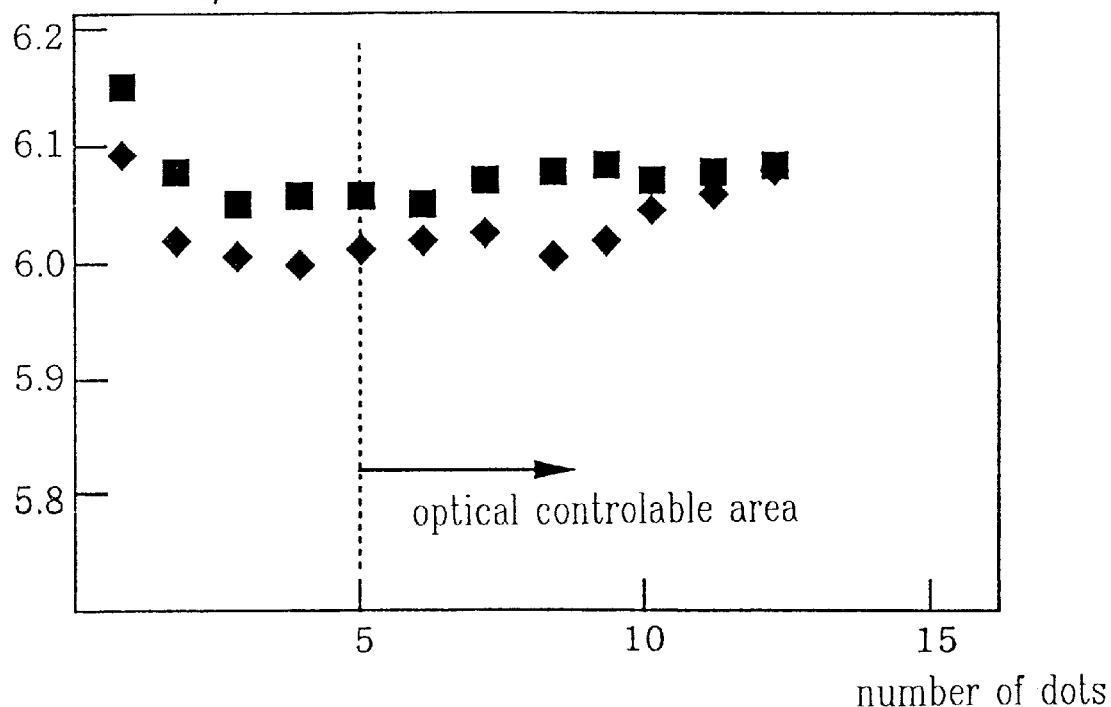
FIG. 11 is a view illustrating the difference in gap in the vicinity of a frame area within a sealing material between a central portion and an end portion of a TCP in a conventional liquid crystal display device.

FIG. 11 is a view illustrating the variation in gap from the inside of a sealing material to the vicinity of the fifth dot in the lighting area in a conventional method.

In FIG. 11, symbol ♦ denotes the measured value of the gap in a portion of lowest area occupation ratio, and symbol ■ denotes the measured value of the gap in a portion of highest area occupation ratio.

From the measured values, it can be seen that the conventional method causes an uneven gap of 0.5 μm or more even in the lighting display area.

Figure 12:
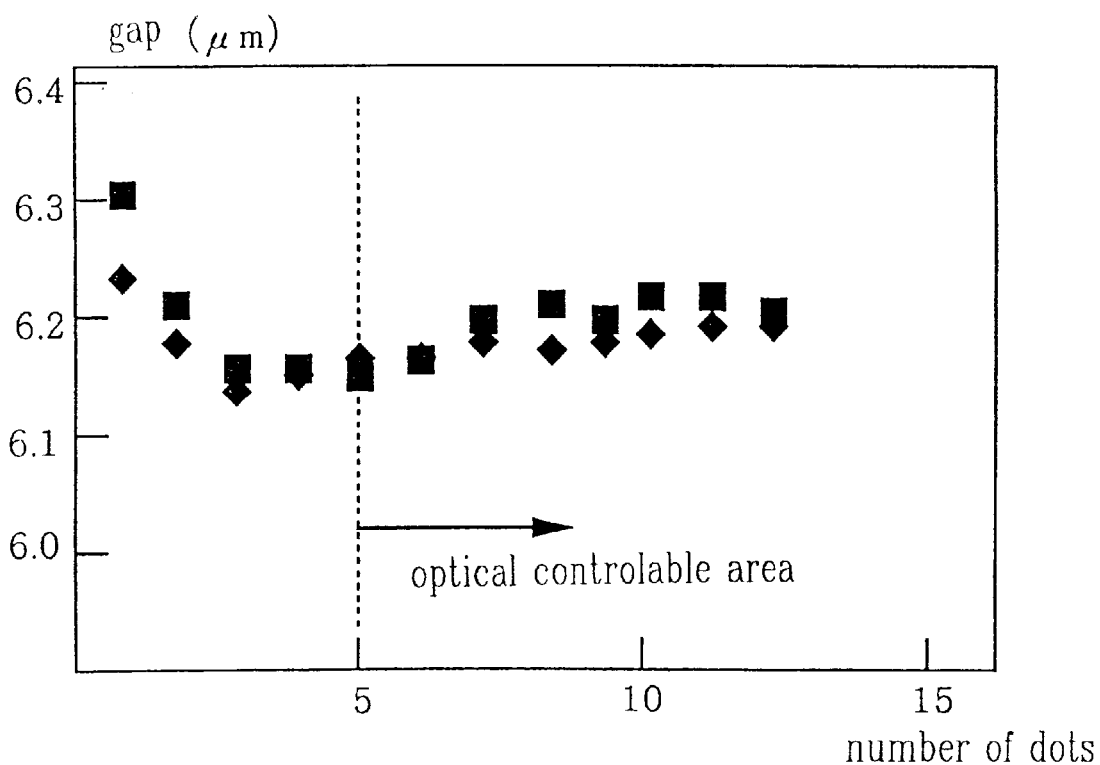
FIG. 12 is a view illustrating the difference in gap in the vicinity of a frame area within a sealing material between a central portion and an end portion of a TCP in a liquid crystal display device according to the present invention.

FIG. 12 is a view illustrating the variation in gap from the inside of a sealing material to the vicinity of the fifth dot in the lighting area in the present invention.

From the measured values, it can be seen that the present invention hardly causes an uneven gap even in the lighting display area.

While the present invention has been specifically described with reference to the embodiment, the present embodiment is not limited to the above-described embodiment, and various modifications may, of course, be effected without departing from the gist of the invention. For example, although the above embodiment has been described with reference to an example in which the present embodiment is applied to a simple matrix type liquid crystal display device, the present embodiment is not limited to such example, and as a matter of course, can also be applied to an active matrix type liquid crystal display device which uses thin film transistors or the like as switching elements.

When the present invention is applied to an active matrix type liquid crystal display device, the display electrodes shown in FIG. 1 are scanning signal lines (i.e., gate signal lines or horizontal signal lines) or video signal lines (i.e., drain signal lines or vertical signal lines) on the substrate on which switching elements are provided.

The entire construction of the liquid crystal display device according to the present embodiment will next be described with reference to FIG. 13.

As shown, a liquid crystal display device 1 to which the present invention is applied includes a metal frame 70 provided on a display-screen side, frame spacers 72 made of an insulation material for preventing the metal frame 70 from coming in contact with a printed wiring board 75, silicon spacers 73, a liquid crystal display element 18 provided therebelow, a light guide plate 84, an intermediate molded frame 76, and a metal frame 71 provided on the back of the display screen.

Incidentally, the liquid crystal display element 18 is provided with tape carrier packages equipped with signal electrode driving circuits in the case of an SIN liquid crystal (super twisted nematic liquid crystal), tape carrier packages 74 equipped with drain electrode driving circuits in the case of a TFT liquid crystal (a thin film transistor liquid crystal), tape carrier packages equipped with scanning electrode driving circuits in the case of the STN liquid crystal (the super twisted nematic liquid crystal), or tape carrier packages 77 equipped with gate electrode driving circuits in the case of the TFT liquid crystal (the thin film transistor liquid crystal). The light source of a backlight of side-edge type includes a cold cathode fluorescent lamp 80, a rubber bush 81 and the like.

Figure 14:
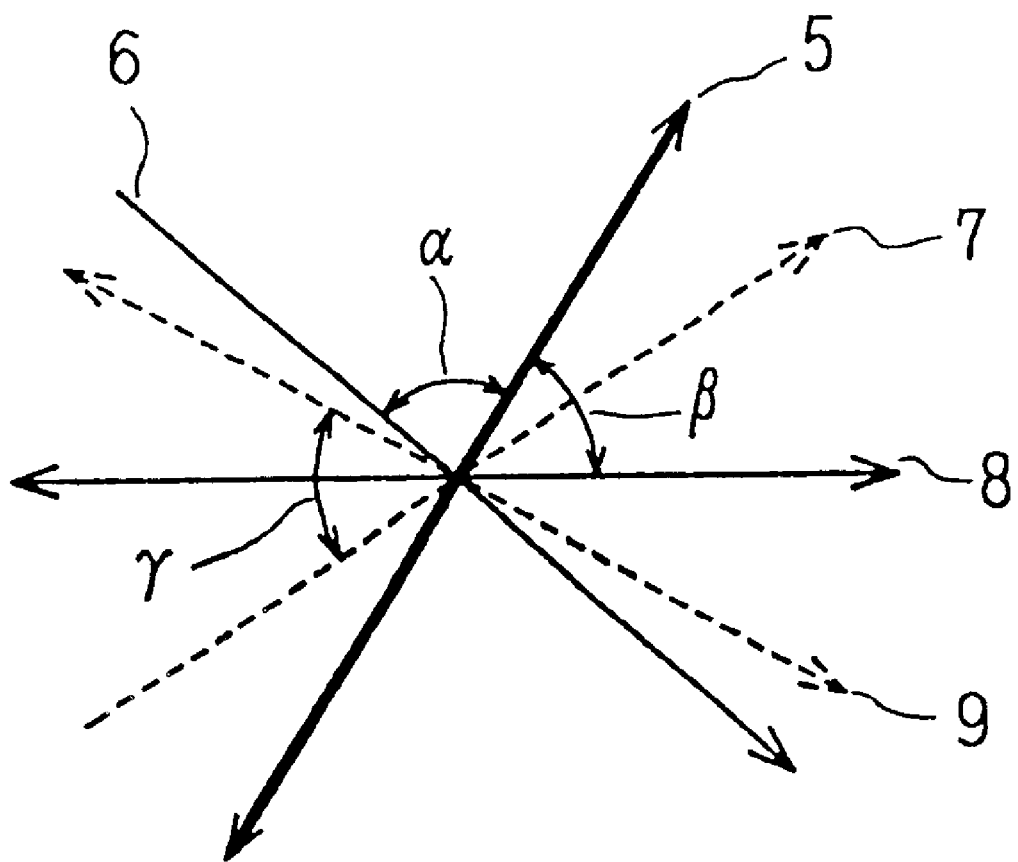
FIG. 14 is a first explanatory view of the relationships between the orientation direction of liquid crystal molecules, the twist direction of the liquid crystal molecules, the directions of the axes of polarizers and the optical axis of a double refraction member in a liquid crystal display device to which the present invention is applied.
Figure 15:
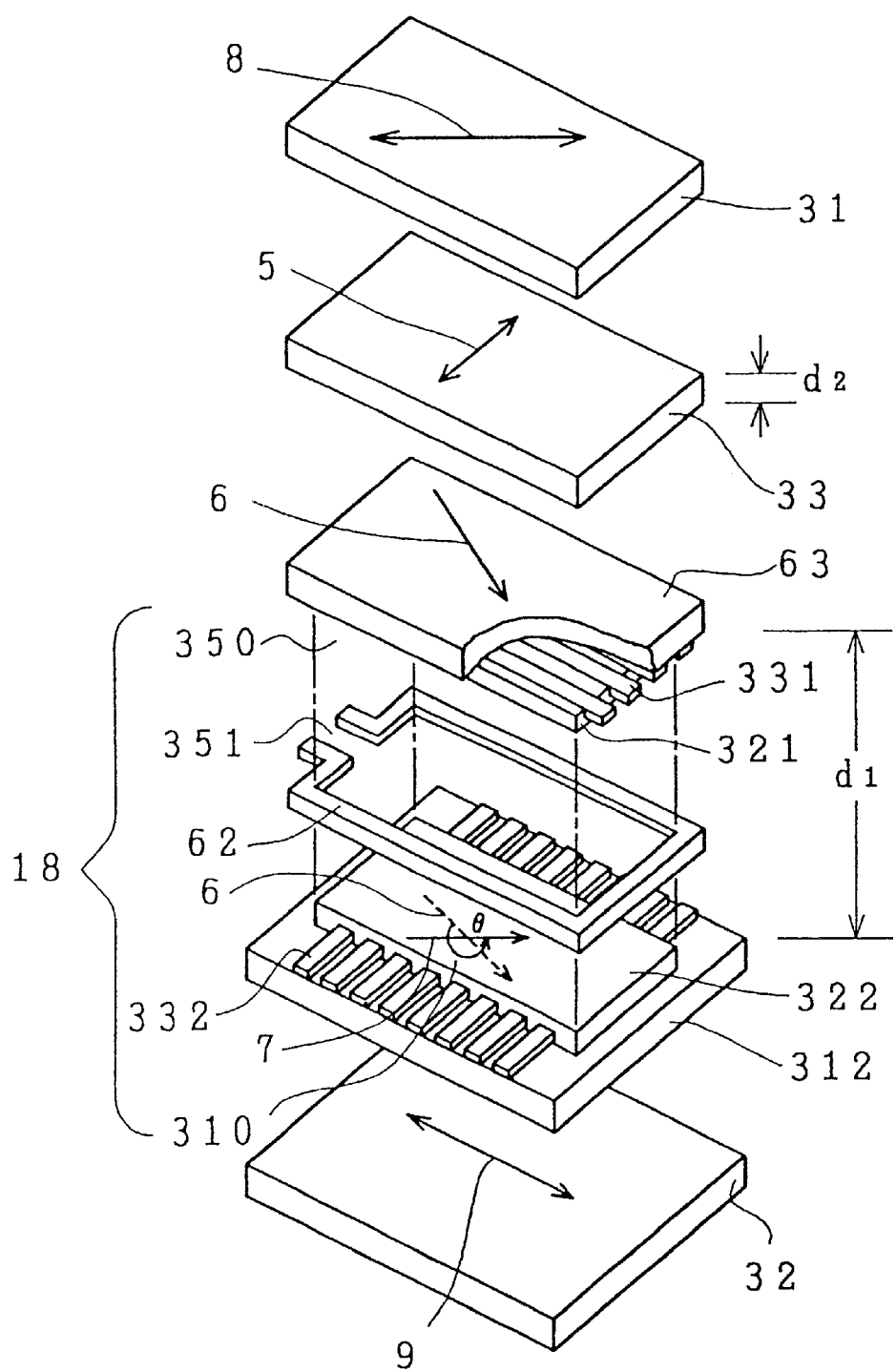
FIG. 15 is a perspective view illustrating the essential portion of the stacking relationship between constituent members in the liquid crystal display device to which the present invention is applied.

FIG. 14 shows the orientation direction (for example, rubbing direction) of liquid crystal molecules, the twist direction of the liquid crystal molecules, the direction of the polarization axis (or the absorption axis) of the polarizers, and the direction of the optical axis of a member which has a double refraction effect, when viewed from above of the liquid crystal display element 18 according to the present invention. FIG. 15 is a perspective view showing the essential portions of the liquid crystal display element according to the present invention.

The twist direction 310 and the twist angle 0 of the liquid crystal molecules are determined by the rubbing direction 6 of the alignment film 321 on a scanning electrode substrate 63, the rubbing direction 7 of the alignment film 322 on the signal electrode substrate 312, and the kind and the amount of an optically active material added to the nematic liquid crystal layer 350 sandwiched between the scanning electrode substrate 63 and the signal electrode substrate 312.

A so-called rubbing method of rubbing in one direction with cloth or the like the surface of the alignment films 321 and 322 made of an organic polymeric resin, for example, polyimide is adopted so that the liquid crystal molecules are so oriented that they have a twisted helical structure between the two upper and lower electrode substrates 63 and 312 which sandwich the liquid crystal layer 350 therebetween in the construction shown in FIG. 15.

The rubbing directions in this method, i.e., the rubbing direction 6 of the upper electrode substrate 63 and the rubbing direction 7 of the lower electrode substrate 312 are the orientation directions of the liquid crystal molecules, respectively.

The two upper electrode substrate 63 and lower electrode substrate 312 subjected to such alignment treatment are opposed to each other with a space dl therebetween in such a manner that the respective rubbing directions 6 and 7 intersect each other at an angle of approximately 180° to 360°. The two upper electrode substrate 63 and lower electrode substrate 312 are bonded together with a frame-shaped sealing material 62 having an injecting port through which to inject a liquid crystal, and if a nematic liquid crystal which has positive dielectric anisotropy and contains a predetermined amount of optically active material is hermetically enclosed in the space of the sealing material 62, the liquid crystal molecules have a molecular orientation having a helical structure of twist angle θ (in FIG. 15) between the electrode substrates 63 and 312. Incidentally, reference numerals 331 and 332 denote the upper and lower electrodes, respectively.

A member 33 which has a double refraction effect (hereinafter referred to as the double refraction member) is disposed on the upper side of the upper electrode substrate 63 of the liquid crystal cell 18 having the above-described construction, and the upper and lower polarizers 31 and 32 are provided with the member 33 and the liquid crystal cell 18 sandwiched therebetween.

The twist angle θ of the liquid crystal molecules in the liquid crystal layer 350 is preferably between 200° and 300°, more preferably, between 230° and 270° in practical terms that excellent time-division characteristics can be maintained by avoiding the phenomenon that the liquid crystal molecules when in an on state are oriented to scatter light in the vicinity of a threshold of a transmissivity-applied voltage curve.

This condition basically makes more sensitive the response of the liquid crystal molecules to voltage and realize excellent time-division characteristics. To obtain an excellent display quality, it is desirable that the product Δn1·d1 of the refractive index anisotropy Δn1 of the liquid crystal layer 350 and the thickness d1 thereof be determined to be preferably 0.5 μm to 1.0 μm, more preferably, 0.6 μm to 0.9 μm.

The double refraction member 33 works to modulate the state of polarization of light transmitted through the liquid crystal cell, to convert colored display into black-and-white display since the liquid crystal cell alone is only capable of providing colored display. For this purpose, the product Δn2–d2 of the refractive index anisotropy Δn2 of the double refraction member 33 and the thickness d2 thereof is extremely important, and is determined to be preferably 0.4 μm to 0.8 μm, more preferably, 0.5 μm to 0.7 μm.

Furthermore, since the liquid crystal display device according to the present invention uses elliptic polarization due to double refraction, the relationships between the axes of the polarizers 31 and 32, the optical axis of a uniaxial transparent double refraction member when used as the double refraction member 33, and the liquid crystal orientation directions 6 and 7 of the respective upper electrode substrates 63 and 312 of the liquid crystal display element are extremely important. he details of the above relationships will be described below with reference to FIG. 14.

FIG. 14 shows the relationships between the axes of the polarizers, the optical axis of the uniaxial transparent double refraction member and the liquid crystal orientation directions of the respective electrode substrates of the liquid crystal display element when the liquid crystal device having the structure of FIG. 15 is viewed from above.

In FIG. 14, reference numeral 5 denotes the optical axis of the uniaxial transparent double refraction member 33, 6 the liquid crystal orientation direction of the upper electrode substrate 63 adjacent to the double refraction member 33, 7 the liquid crystal orientation direction of the lower electrode substrate 312, and 8 the absorption axis or polarization axis of the upper polarizer 31. An angle α is the angle between the liquid crystal orientation direction 6 of the scanning electrode substrate 63 and the optical axis 5 of the uniaxial transparent double refraction member 33, an angle β is the angle between the absorption axis or polarization axis 8 of the upper polarizer 31 and the optical axis 5 of the uniaxial transparent double refraction member 33, and an angle γ is the angle between the absorption axis or polarization axis 9 of the lower polarizer 32 and the liquid crystal orientation direction 7 of the lower electrode substrate 312.

A method of measuring the above angles α, β and γ will be defined below. By way of example, the angles of intersection of the optical axis 5 of the double refraction member 33 and the liquid crystal orientation direction 6 of the scanning electrode substrate 63 will be described with reference to FIGS. 19A and 19B.

Figure 19A:
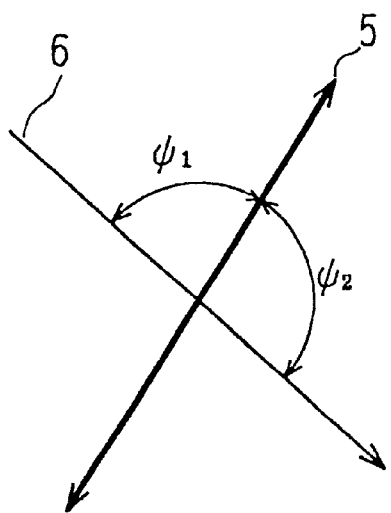
FIGS. 19A and 19B are views illustrating a method of measuring the intersectional angles a, D and y in the liquid crystal display device according to the present invention.
Figure 19B:
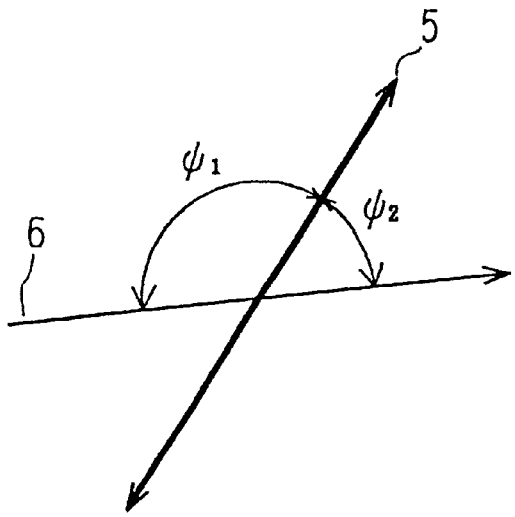

Although the angles of intersection of the optical axis 5 and the liquid crystal orientation direction 6 can be represented by ψ1 or ψ2, as shown in FIGS. 19A and 19B, the small angle of ψ1 and ψ2 is selected herein.

Specifically, in FIG. 19A, since ψ1<ψ2, ψ1 is selected as the angle of intersection of the optical axis 5 and the liquid crystal orientation direction 6, whereas, in FIG. 19B, since ψ1>ψ2, ψ2 is selected as the angle of intersection of the optical axis 5 and the liquid crystal orientation direction 6. Of course, if ψ1=ψ2, either of the angles may be selected.

In this type of liquid crystal display device, the angles α, β and γ are extremely important. It is desirable that the angle a be preferably 50° to 90°, more preferably, 70° to 90°, the angle D be preferably 20° to 70°, more preferably, 30° to 60°, and the angle γ be preferably 0° to 70°, more preferably, 0° to 50°.

If the twist angle θ of the liquid crystal layer 350 of the liquid crystal display element is in the range of 180° to 360°, each of the above angles α, β and γ may be within the above range whether the twist direction 310 is clockwise or counterclockwise.

Although in the construction shown in FIG. 15 the double refraction member 33 is disposed between the upper polarizer 31 and the upper electrode substrate 63, the double refraction member 33 may also be disposed between the lower electrode substrate 312 and the lower polarizer 32. In this case, the construction is the inverted construction shown in FIG. 15.

Although the details of another construction will be described below with reference to FIG. 16, its basic structure is similar to that shown in FIGS. 14 and 15.

Figure 16:
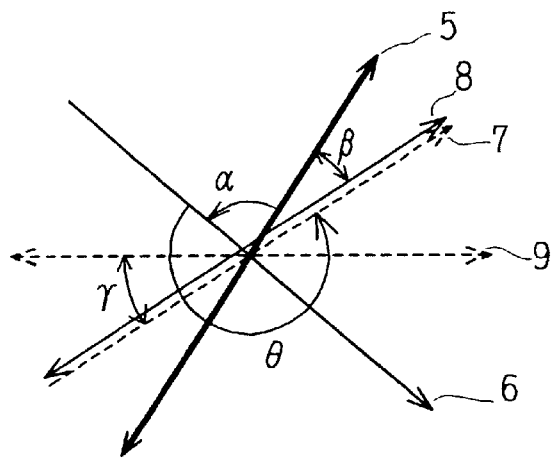
FIG. 16 is a second explanatory view of the relationships between the orientation direction of liquid crystal molecules, the twist direction of the liquid crystal molecules, the directions of the axes of polarizers and the optical axis of a double refraction member in the liquid crystal display device to which the present invention is applied.

Referring to FIG. 16, the twist angle θ of liquid crystal molecules is 240°, and a liquid crystal cell which is parallel oriented (homogeneous orientation), i.e., has a twist angle of 0°, is used as the uniaxial transparent double refraction member 33.

The d/p ratio of the thickness d (μm) of the liquid crystal layer to the helical pitch p (μm) of the liquid crystal material which contains an optically active substance is about 0.53. The alignment films 321 and 322 are formed of polyimide resin film and is subjected to rubbing treatment. The tilt angle (pretilt angle) at which the liquid crystal molecules in contact with the alignment films subjected to the rubbing treatment are tilted with respect to the substrate surfaces by the alignment films is about 4°. Δn2·d2 of the uniaxial transparent double refraction member 33 is about 0.6 μm. Δn1·d1 of the liquid crystal layer 350 having a structure in which the liquid crystal molecules are 240° twisted is about 0.8 μm.

In this construction, by setting the angles α, β and γ at about 90°, about 30° and about 30°, respectively, it is possible to realize the following black-and-white display. If the voltage applied to the liquid crystal layer 350 via the upper and lower upper electrode substrates 63 and 332 is below a threshold, light is not transmitted, i.e., black is displayed, whereas if such voltage is above the threshold, light is transmitted, i.e., white is displayed. If the axis of the lower polarizer 32 is rotated from the above position through 50° to 90°, it is possible to realize black-and-white display, reverse to the above-described one. That is, if the voltage applied to the liquid crystal layer 350 is below the threshold, white is displayed, whereas if the voltage is above the threshold, black is displayed.

Figure 17:
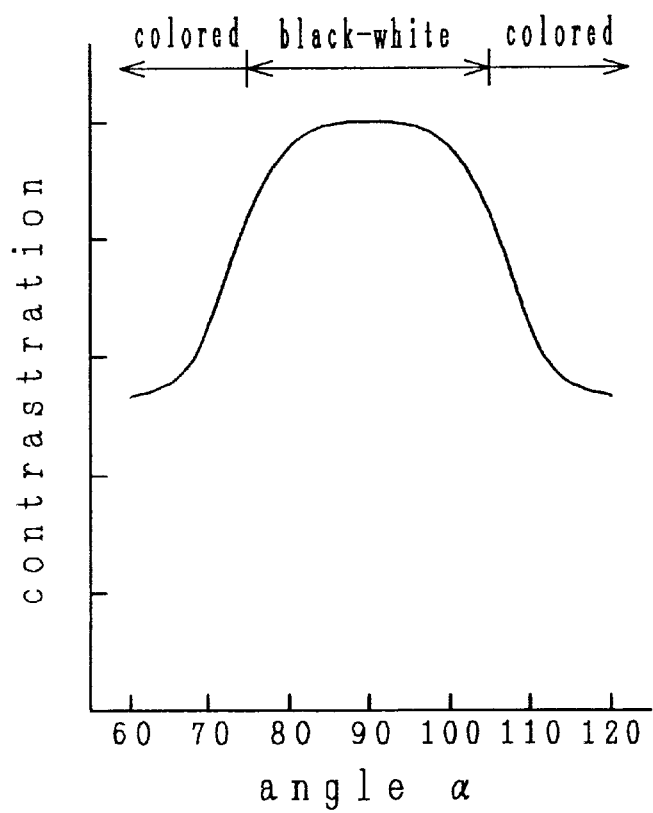
FIG. 17 is a graph showing the contrast and transmitted light color-intersectional angle a characteristics in the liquid crystal display device to which the present invention is applied.

FIG. 17 shows the contrast variation during time-division driving with 1/200 duty when the angle α is varied in the case of the construction shown in FIG. 15. Extremely high contrast is obtained when the angle α is in the vicinity of 90°, but as the deviation of the angle α from this angle becomes larger, contrast becomes lower. Furthermore, as the angle α becomes smaller, both the lighting portion and the ncn-lighting portion become more bluish, whereas as the angle α becomes larger, the lighting portion and the non-lighting portion become more purple and more yellow, respectively. In either case, black-and-white display is impossible. Although a nearly similar result is obtained for each of the angles D and γ, if the angle γ rotates through 50° to nearly 90°, a reverse black-and-white display is obtained as described above.

Figure 18:
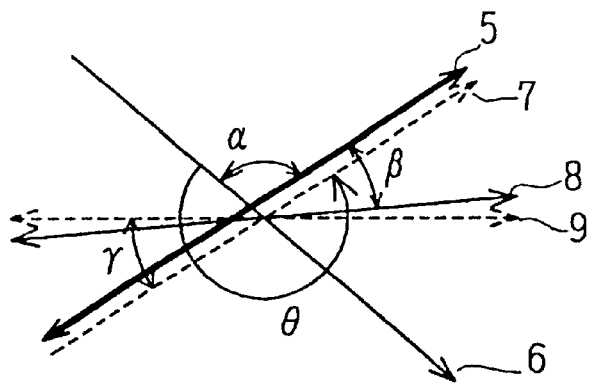
FIG. 18 is a third explanatory view of the relationships between the orientation direction of liquid crystal molecules, the twist direction of the liquid crystal molecules, the directions of the axes of polarizers and the optical axis of a double refraction member in the liquid crystal display device to which the present invention is applied.

The details of another construction will be described below with reference to FIG. 18. The basic structure is similar to the above-described example except that the twist angle of the liquid crystal molecules in the liquid crystal layer 350 is 260° and Δn1·d1 is about 0.65 μm to 0.75 μm. Δn2·d2 for a parallel liquid crystal layer used as the uniaxial transparent double refraction member 33 is about 0.58 μm, similarly to that stated above with reference to FIG. 15.

In this construction, by setting the angles α, β and γ at about 100°, about 35° and about 15°, respectively, it is possible to realize a black-and-white display similar to the above-described one. In addition, if the position of the axis of the lower polarizer is rotated from the above position through 50° to 90°, it is possible to realize the reverse black-and-white display, in a manner similar to that described above with reference to FIG. 15. The inclination for the deviation of each of the angles α, β and γ is nearly similar to that described above with reference to FIG. 15.

Although in any of the above specific examples a parallel liquid crystal cell having untwisted liquid crystal molecules is used as the uniaxial transparent double refraction member 33; if a liquid crystal layer in which the liquid crystal molecules are twisted by approximately 20° to 60° is used, the angle-dependant color variation becomes small. Similarly to the above-described liquid crystal layer 350, this twisted liquid crystal layer is formed by sandwiching a liquid crystal between a pair of transparent substrates subjected to alignment treatment, which are opposed to each other in such a manner that their alignment-treatment directions intersect each other at a predetermined twist angle. In this case, the direction of a bisected angle of the included angle of the two alignment-treatment directions which sandwiches the twist structure of the liquid crystal molecules may be handled as the optical axis of the double refraction member.

A transparent polymeric film may also be used as the double refraction member 33 (in this case, a uniaxial oriented film is preferable). In this case, PET (polyethylene terephthalate), acrylic resin and polycarbonate are effectively used as the polymeric film.

In any of the above specific examples, although one double refraction member is used, another double-refraction member can be inserted between the lower electrode substrate 312 and the lower polarizer 32 in addition to the double refraction member 33 in the construction shown in FIG. 15. In this case, Δn2·d2 for these double refraction members may be readjusted.

The structure of the upper electrode substrate 63 will be described below with reference to the perspective view of FIG. 22.

The basic structure is similar to that stated above with reference to FIG. 15. However, as shown in FIG. 22, red, green and blue color filters R, G and B are provided on the upper electrode substrate 311, and a light blocking film 53 is provided between the color filters, so that multiple color display is enabled. FIG. 18 shows the relationships between the orientation direction of liquid crystal molecules, the twist direction of the liquid crystal molecules, the directions of the axes of the polarizers, and the optical axis of the double refraction member. Detailed description of the relationships will be omitted.

Figure 20:
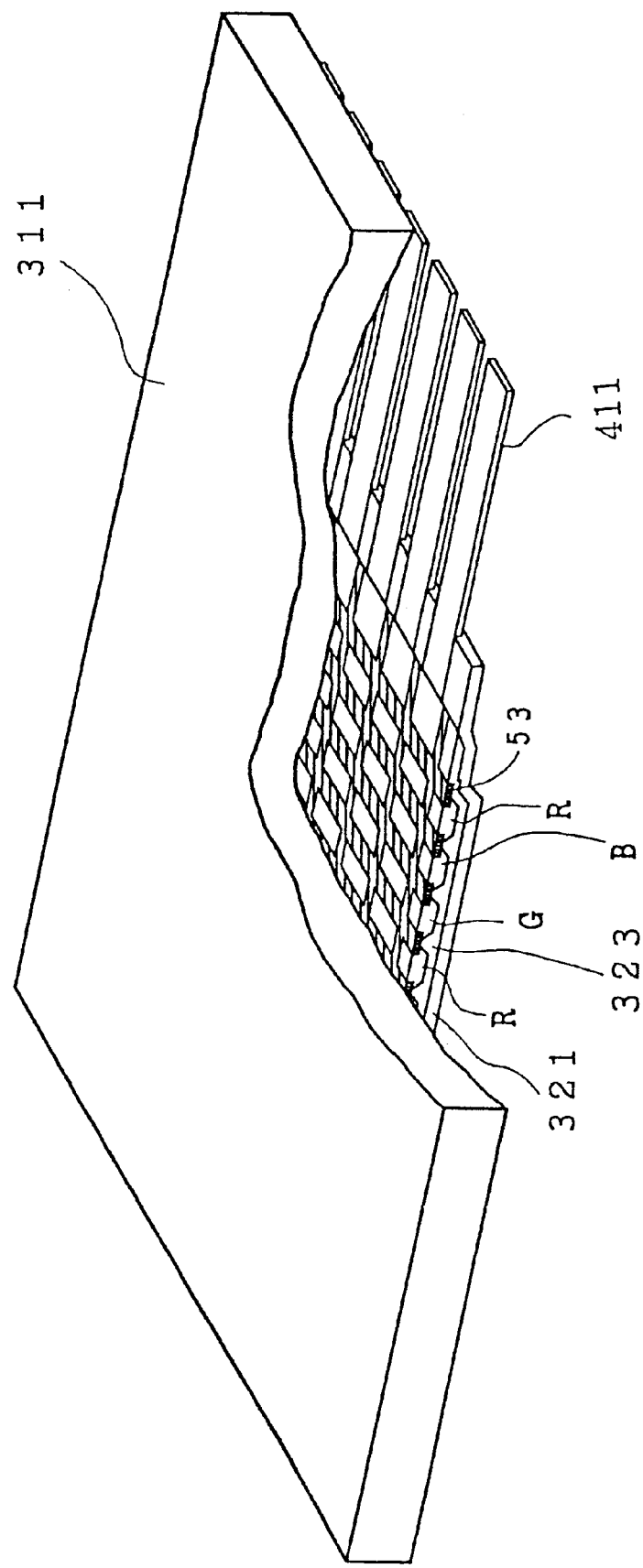
FIG. 20 is a partly cutaway perspective view illustrating the construction of a scanning electrode substrate portion in the liquid crystal display device according to the present invention.

In the construction shown in FIG. 20, a smoothing layer 323 made of an insulation material for reducing the unevenness of the color filters R, G and B and the light blocking film 53 is formed on them, and an upper electrode substrate 411 and the alignment film 321 are formed on the smoothing layer 323.

Figure 22:
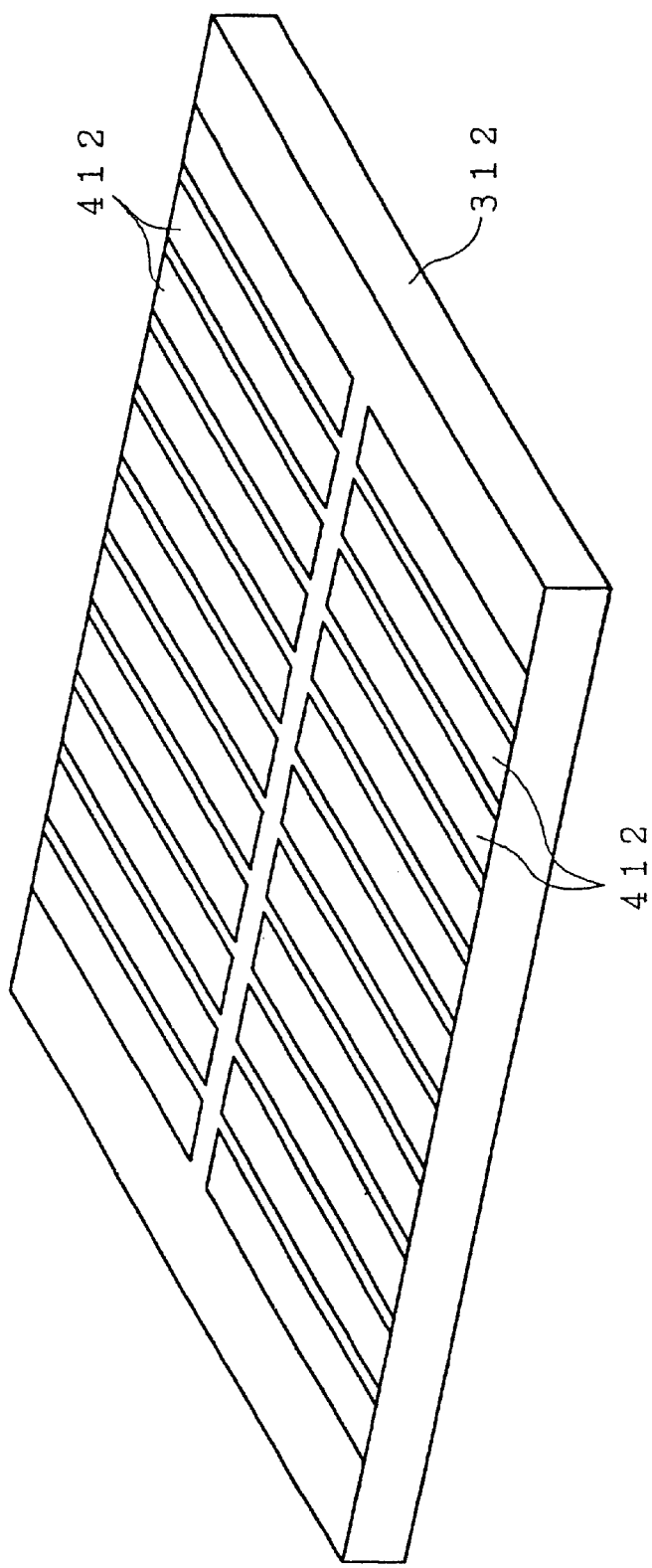
FIG. 22 is a perspective view illustrating the construction of a signal electrode substrate portion in the liquid crystal display device according to the present invention.

FIG. 22 is a schematic perspective view of the signal electrode substrate 312 opposed to the scanning electrode substrate 311 shown in FIG. 20.

Although the illustration of alignment films and the like is omitted, each of the signal electrodes 412 is divided into an upper signal electrode and a lower signal electrode so as to separately drive the upper screen and the lower screen.

Figure 13:
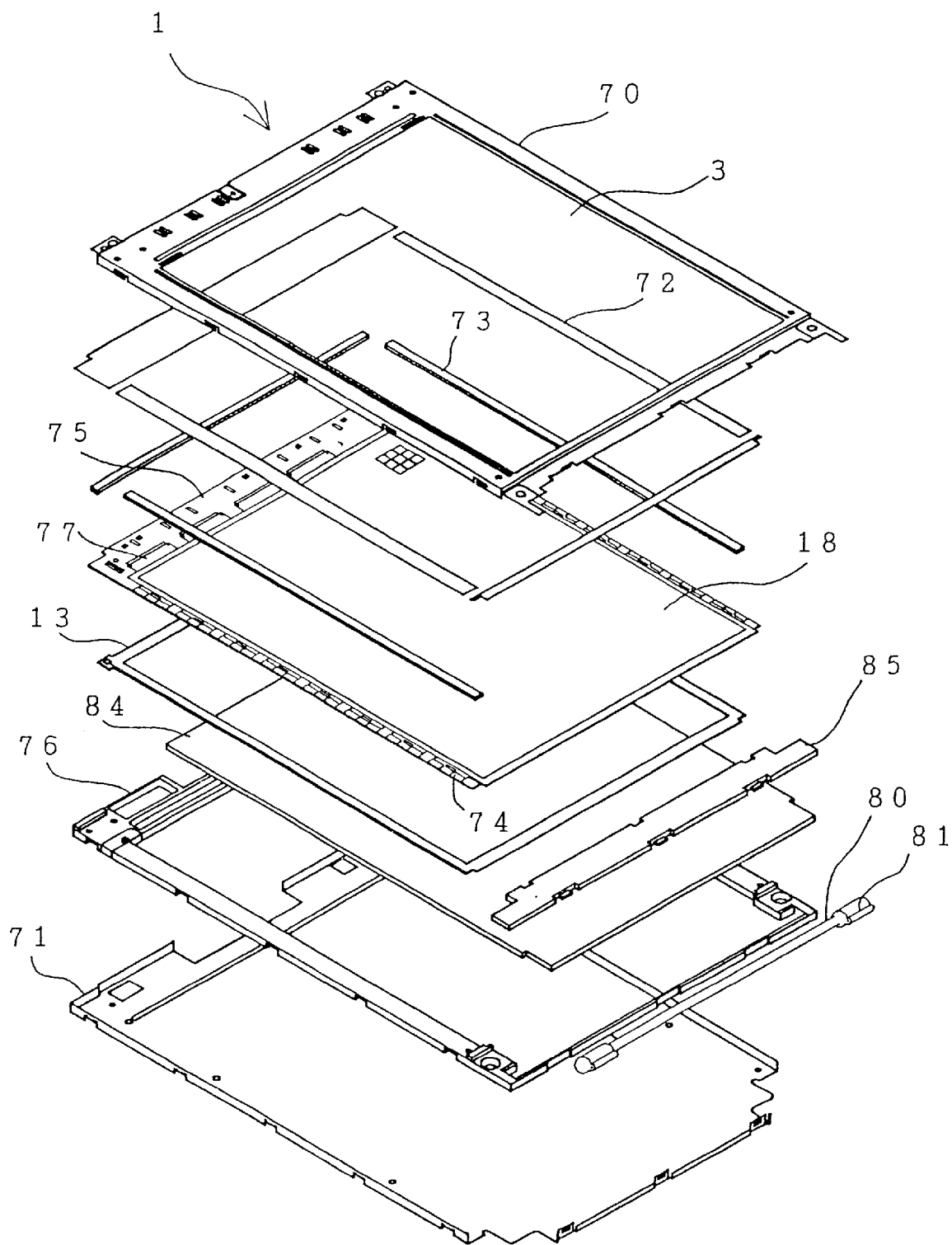
FIG. 13 is an exploded perspective view of one example of a liquid crystal display device to which the present invention is applicable.
Figure 21:
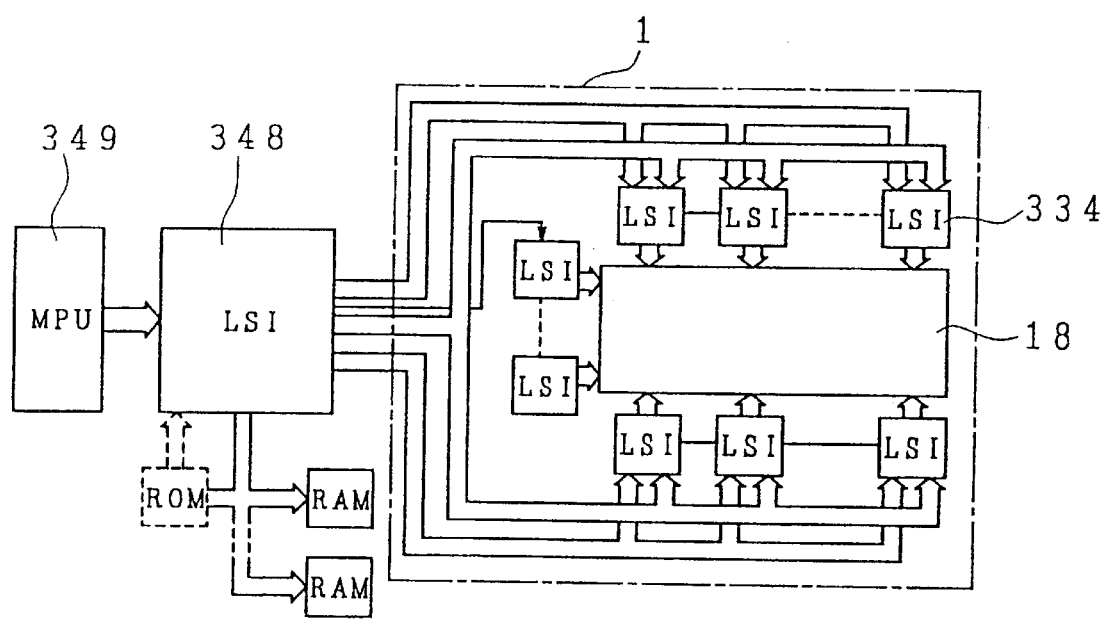
FIG. 21 is a functional block diagram showing a case in which the liquid crystal display device according to the present invention is used in a display portion of a laptop personal computer.
Figure 23:
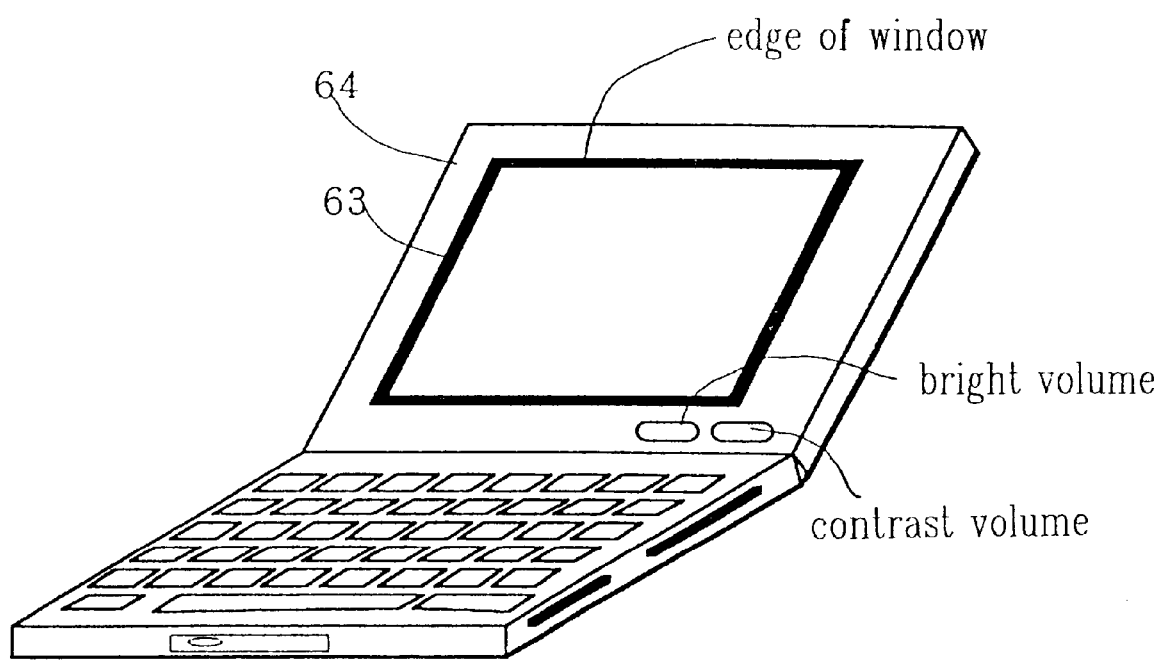
FIG. 23 is an appearance view illustrating the case in which the liquid crystal display device according to the present invention is used in a display portion of the laptop personal computer.

FIG. 21 shows a block diagram of a circuit in which the liquid crystal display device 1 according to the present invention shown in FIG. 13 is used in a display part of a notebook or a laptop personal computer. FIG. 23 shows the state that the liquid crystal display device 1 is mounted in a notebook or laptop personal computer 64.

Referring to FIG. 21, a liquid crystal display module is driven by a driver IC 334 controlled by a control LSI 348 in accordance with a result calculated by a microprocessor 349.

[Industrial Applicability]

The present invention can be applied to an STN liquid crystal and the like which is a representative of a simple matrix liquid crystal, as described previously, and can be put into practice in liquid crystal manufacturing industry.

What is claimed is:

1. A liquid crystal display device suited to a narrow frame comprising a pair of liquid crystal display element substrates which are opposed to each other with a liquid crystal sandwiched therebetween and sealed with a sealing material; and a plurality of liquid crystal driving elements, connected to a wiring formed on each of said liquid crystal display element substrates, for driving the liquid crystal, each of said liquid crystal display element substrates including a plurality of display electrodes wired in parallel, a plurality of parallel terminal electrodes extended to an end of each of said liquid crystal display element substrates and connected to each of said liquid crystal driving elements, generally parallel oblique straight wiring electrodes for connecting said display electrodes and said terminal electrodes, respectively, and a plurality of dummy electrodes disposed generally parallel to the terminal electrodes between the terminal electrodes at least in a central portion of each of said liquid crystal driving circuits, each of the conductor electrodes being formed so that a variation in wiring resistance between the central portion and an end portion of each of said liquid crystal driving circuits and a variation in the area occupation ratio per unit area of conductors disposed below the sealing material are smaller than predetermined allowable values, respectively.

2. A liquid crystal display device according to claim 1, characterized in that the variation in area occupation ratio per unit area of the wiring disposed below the sealing material is 3% or below.

3. A liquid crystal display device according to claim 1, characterized in that the variation in wiring resistance of the central portion and the end portion of each of said liquid crystal driving circuits is 4.5% or below.

4. A liquid crystal display device according to claim 1, characterized in that the distance from an outside vicinity of the sealing material to pixels in a lighting area is approximately 2.75 mm or below.

5. A liquid crystal display device according to claim 4, characterized in that a dummy color filter layer for several pixels is provided inside the sealing material, and the pixels in the lighting area are those inside the dummy color filter layer.

6. A liquid crystal display device according to claim 1, characterized in that the predetermined allowable value for the variation in area occupation ratio per unit area of the wiring disposed below the sealing material is greater than 3%.

7. A liquid crystal display device according to claim 1, characterized in that the predetermined allowable value for the variation in wiring resistance of the central portion and the end portion of each of said liquid crystal driving circuits is greater than 4.5%.

* * * * *